(12) United States Patent
Chen et al.

(10) Patent No.: US 9,906,804 B2
(45) Date of Patent: Feb. 27, 2018

(54) REFERENCE LAYER SAMPLE POSITION DERIVATION FOR SCALABLE VIDEO CODING

(71) Applicant: QUALCOMM Incorporated, San Diego, CA (US)

(72) Inventors: Jianle Chen, San Diego, CA (US); Krishnakanth Rapaka, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 14/598,117

(22) Filed: Jan. 15, 2015

(65) Prior Publication Data

US 2015/0201204 A1    Jul. 16, 2015

Related U.S. Application Data

(60) Provisional application No. 61/928,358, filed on Jan. 16, 2014, provisional application No. 61/954,525, (Continued)

(51) Int. Cl.
*H04N 19/33*    (2014.01)
*H04N 19/30*    (2014.01)
(Continued)

(52) U.S. Cl.
CPC ............. *H04N 19/33* (2014.11); *H04N 19/30* (2014.11); *H04N 19/61* (2014.11); *H04N 19/70* (2014.11); *H04N 19/82* (2014.11); *H04N 19/59* (2014.11)

(58) Field of Classification Search
CPC ........ H04N 19/33; H04N 19/30; H04N 19/61; H04N 19/70; H04N 19/82; H04N 19/59
See application file for complete search history.

(56) References Cited

U.S. PATENT DOCUMENTS

2013/0208792 A1* 8/2013 He ................... H04N 19/00569
375/240.12
2014/0307773 A1* 10/2014 Minoo ................... H04N 19/70
375/240.02

OTHER PUBLICATIONS

Guo et al., "Signaling of Phase Offset in Up-sampling Process and Chroma Sampling Location," Joint Collaborative Team on Video Coding (JCT-VC) of ITU-T SG 16 WP 3 and ISO/IEC JTC 1/SC 29/WG 11, Apr. 2013.*

(Continued)

*Primary Examiner* — Thai Tran
*Assistant Examiner* — Christopher T Braniff
(74) *Attorney, Agent, or Firm* — Procopio, Cory, Hargreaves & Savitch LLP

(57) ABSTRACT

Systems and methods for encoding and decoding scalable video information are disclosed. The system may have a memory unit configured to store syntax elements for a multi-layer picture. The system may further comprise one or more processors operationally coupled to the memory unit. The processors may be configured to determine at least one phase offset value between a reference layer sample position in the multi-layer picture and a corresponding enhancement layer sample position. The processors may be further configured to generate a syntax element indicating the phase offset value the phase offset value representing a phase offset of a luma sample position and a chroma sample position of the reference layer position.

30 Claims, 8 Drawing Sheets

Related U.S. Application Data filed on Mar. 17, 2014, provisional application No. 61/974,794, filed on Apr. 3, 2014, provisional application No. 62/002,622, filed on May 23, 2014, provisional application No. 62/014,019, filed on Jun. 18, 2014.

(51) Int. Cl.
*H04N 19/61* (2014.01)
*H04N 19/70* (2014.01)
*H04N 19/82* (2014.01)
*H04N 19/59* (2014.01)

(56) References Cited

OTHER PUBLICATIONS

Chen J., et al., "On phase alignment of up-sampling process in SHVC", 15. JCT-VC Meeting; Oct. 23, 2013-Jan. 11, 2013; Geneva; (Joint Collaborative Team on Video Coding of ISO/IEC JTC1/SC29NVG11 and ITU-T SG.16); URL: http://wftp3.itu.int/av-arch/jctvc-site/,, No. JCTVC-O0215, pp. 1-4, Oct. 15, 2013 (Oct. 15, 2013), XP030115264.

Chen J., et al., "On phase offset for resampling process in SHVC", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/,, No. JCTVC-Q0168, pp. 3, Mar. 18, 2014 (Mar. 18, 2014), XP030116114.

Guo L., et al., "Signaling of Phase Offset in Up-sampling Process and Chroma Sampling Location", 13. JCT-VC Meeting; 104. MPEG Meeting; Incheon; (Joint Collaborative Team on Video Coding of ISO/IEC JTC1/SC29/WG11 and ITU-T SG.16), No. JCTVC-M0465, Apr. 25, 2013 (Apr. 25, 2013), pp. 1-8, XP030114422.

International Search Report and Written Opinion—PCT/US2015/011828—ISA/EPO—Apr. 7, 2015 (141701WO).

MINOO K., et al., "AHG13: SHVC Upsampling with phase offset adjustment", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0263, pp. 7, Apr. 11, 2013 (Apr. 11, 2013), XP030114220.

\* cited by examiner

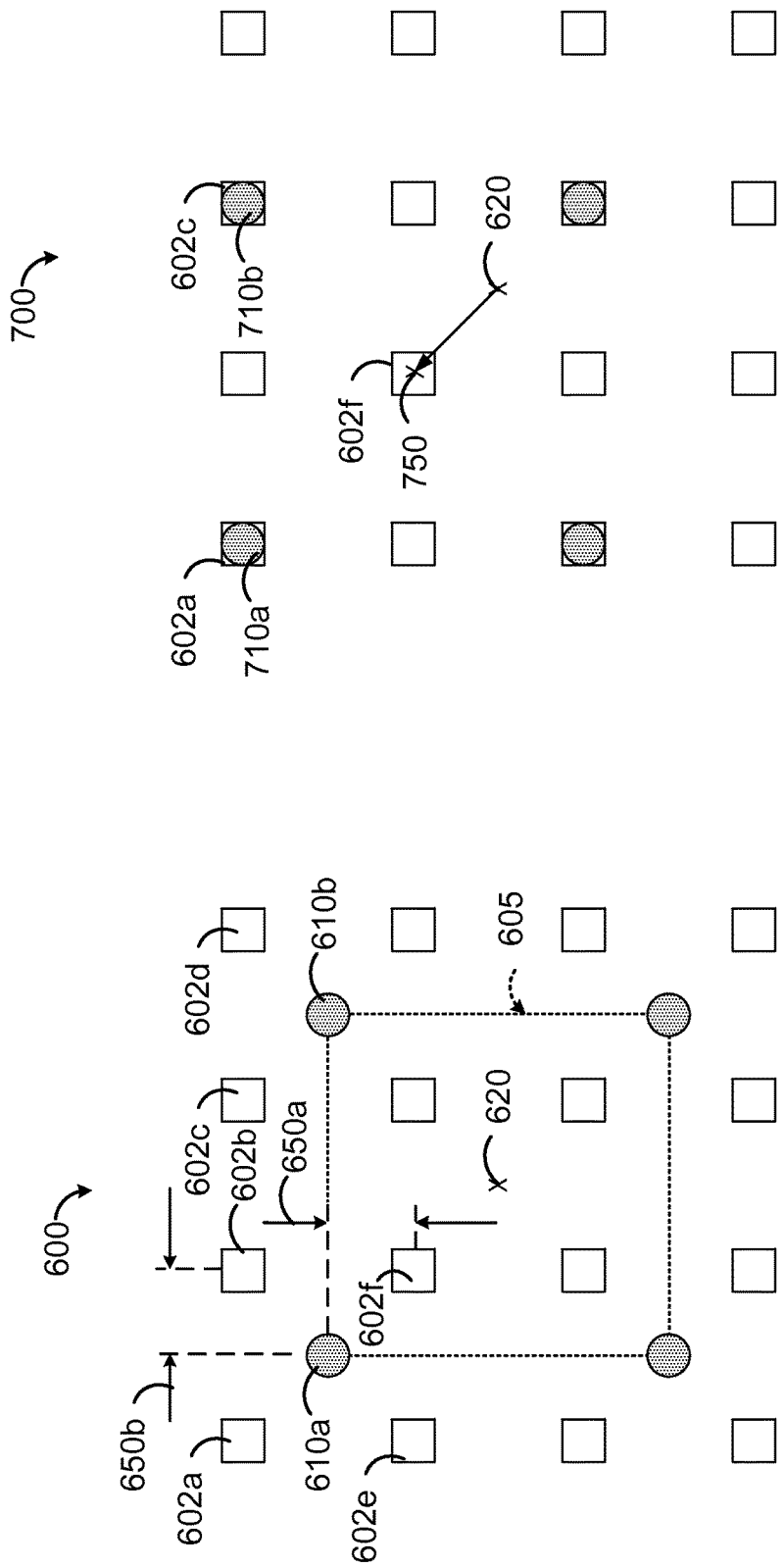

REFERENCE LAYER SAMPLE POSITION DERIVATION FOR SCALABLE VIDEO CODING

INCORPORATION BY REFERENCE TO ANY PRIORITY APPLICATIONS

This application claims the benefit of U.S. Provisional Application No. 61/928,358, filed Jan. 16, 2014, entitled "REFERENCE LAYER SAMPLE LOCATION DERIVATION FOR SCALABLE VIDEO CODING," U.S. Provisional Application No. 61/954,525, filed Mar. 17, 2014, entitled "REFERENCE LAYER SAMPLE LOCATION DERIVATION FOR SCALABLE VIDEO CODING," U.S. Provisional Application No. 61/974,794, filed Apr. 3, 2014, entitled "REFERENCE LAYER SAMPLE LOCATION DERIVATION FOR SCALABLE VIDEO CODING," U.S. Provisional Application No. 62/002,622, filed May 23, 2014, entitled "REFERENCE LAYER SAMPLE LOCATION DERIVATION FOR SCALABLE VIDEO CODING," and U.S. Provisional Application No. 62/014,019, filed Jun. 18, 2014, entitled "REFERENCE LAYER SAMPLE LOCATION DERIVATION FOR SCALABLE VIDEO CODING," which are each incorporated by reference in their entirety.

BACKGROUND

Technological Field

This disclosure is related to the field of video coding and compression. In particular, it is related to scalable video coding (SVC), including SVC for Advanced Video Coding (AVC), as well as SVC for High Efficiency Video Coding (HEVC), which is also referred to as Scalable HEVC (SHVC).

Background

Scalable video coding enables the encoding of high-quality video data that contains one or more subset bitstreams that can each be decoded with a complexity and reconstruction quality similar to existing video encoding and compression techniques. The subset bitstreams may be recovered by dropping certain packets from the larger bitstream.

For example, the subset bitstream may represent a lower spatial resolution (e.g., a smaller screen size), a lower temporal resolution (e.g., a lower frame rate), or a lower signal quality (e.g., lower signal fidelity) as compared to the larger bitstream. The data and decoded samples of each of these lower quality aspects (or bitstreams) can be used to predict data or samples of higher qualities/bit rates in order to reduce the bit rate to code the higher qualities. Accordingly, resolution, bit rate, and fidelity may be scaled to reduce bit rates and improve forward compatibility, as described below.

In H.264/SVC, a sophisticated solution is used to achieve high coding efficiency of an interlaced video sequence. The adaptive frame/field coding method may be supported in both a base layer (BL) and an enhancement layer (EL), meaning the base layer and enhancement layer picture can be a progressive frame, interlaced frame, a top field picture or bottom field picture. Such a design is highly complicated and may present a complex solution for interlaced bitstreams. The design of scalable video coding may be simplified while taking the advantage of an interlaced base layer stream.

SUMMARY

In general, this disclosure describes methods and techniques related to scalable video coding (SVC). The systems, methods and devices of this disclosure each have several innovative aspects, no single one of which is solely responsible for the desirable attributes disclosed herein.

One aspect of the disclosure provides an apparatus for coding scalable high efficiency video information. The apparatus may comprise a memory unit configured to store syntax elements for a multi-layer picture. A processor can be operationally coupled to the memory unit and configured to generate a syntax element indicating a phase offset value between a reference layer sample position in the multi-layer picture and a corresponding enhancement layer sample position. The phase offset value can represent a phase offset of the luma sample position and a chroma sample position from the reference layer sample position. Each of the luma sample position and the chroma sample position can have a horizontal component and a vertical component in an enhancement layer and a corresponding reference layer for the multi-layer picture. The processor can further encode a block based on the data encoded in the generated syntax element.

Another aspect of the disclosure provides a method for coding scalable high efficiency video information. The method may comprise storing syntax elements for a multi-layer picture. The method may further comprise determining at least one phase offset value between a reference layer sample position in the multi-layer picture and a corresponding enhancement layer sample position. The method may further comprise generating a syntax element indicating the phase offset value. The phase offset value can represent a phase offset of a luma sample position and a chroma sample position of the reference layer position. Each of the luma sample position and the chroma sample position can have a horizontal component and a vertical component in an enhancement layer and a corresponding reference layer for the multi-layer picture. The method may further comprise encoding a block based on the data encoded in the generated syntax element.

Another aspect of the disclosure provides an apparatus for decoding scalable high efficiency video information. The apparatus may comprise a receiver configured to receive a bitstream having syntax elements for a multi-layer picture. The apparatus may further comprise a memory unit configured to store syntax elements for a multi-layer picture. A processor can be operationally coupled to the memory unit and configured to obtain at least one phase offset value associated with the multi-layer picture from the syntax elements. The processor may be further configured to derive a reference layer sample position based on the at least one phase offset value. The at least one phase offset value can be obtained for each pair of an enhancement layer and a corresponding reference layer for the picture. The phase offset can represent a phase offset of a luma sample position and a chroma sample position of the reference layer sample position. Each of the luma sample position and the chroma sample position can have a horizontal component and a vertical component. The processor may be further configured to decode a block based on the received syntax elements Another aspect of the disclosure provides a method for decoding scalable high efficiency video information. The method may comprise receiving bitstream having syntax elements for a multi-layer picture. The method may further comprise obtaining at least one phase offset value associated with the multi-layer picture from the syntax elements. The method may further comprise deriving a reference layer sample position based on the at least one phase offset value. The at least one phase offset value can be obtained for each pair of an enhancement layer and a corresponding reference layer for the picture. The phase offset value can represent a phase offset of a luma sample position and a chroma sample position of the reference layer. Each of the luma sample position and the chroma sample position can have a horizontal component and a vertical component. The method may further comprise decoding a block based on the received syntax elements.

Other features and advantages of the present invention should be apparent from the following description which illustrates, by way of example, aspects of the invention.

DESCRIPTION OF THE DRAWINGS

The details of embodiments of the present invention, both as to their structure and operation, may be gleaned in part by study of the accompanying drawings, in which like reference numerals refer to like parts, and in which:

FIG. 6 is a graphical representation of symmetrical down sampling of enhancement layer luma samples;

FIG. 7 is a graphical representation of zero-phase down-sampling; and

DETAILED DESCRIPTION

Figure 1:
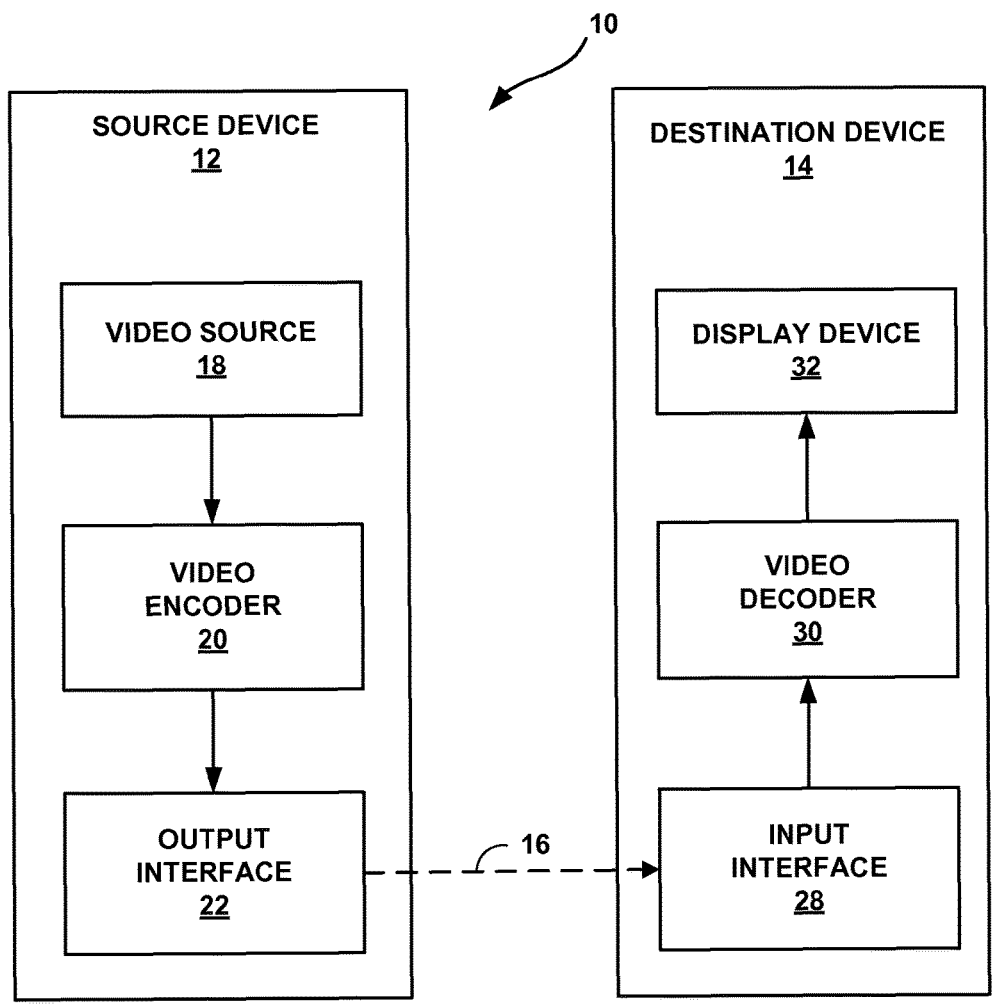
FIG. 1 is a block diagram that illustrates an example video coding system.

The detailed description set forth below, in connection with the accompanying drawings, is intended as a description of various embodiments and is not intended to represent the only embodiments in which the invention may be practiced. The detailed description includes specific details for the purpose of providing a thorough understanding of the embodiments. However, it will be apparent to those skilled in the art that the invention without these specific details. In some instances, well-known structures and components are shown in simplified form for brevity of description. In some instances certain methods and systems implementing the methods may be referred to herein as techniques.

The embodiments described in this disclosure generally relate to scalable video coding (SHVC, SVC) and multiview/3D video coding (e.g., multiview coding plus depth, MVC+D). For example, the embodiments may be related to, and used with or within, a High Efficiency Video Coding (HEVC) scalable video coding (SVC, sometimes referred to as SHVC) extension. In an SHVC, SVC extension, there could be multiple layers of video information. The layer at the very bottom level may serve as a base layer (BL), and the layer at the very top (or the highest layer) may serve as an enhanced layer (EL). The "enhanced layer" is sometimes referred to as an "enhancement layer," and these terms may be used interchangeably. The base layer is sometimes referred to as a "reference layer," (RL) and these terms may also be used interchangeably. All layers in between the base layer and the top layer may serve as either or both ELs or reference layers (RLs). For example, a layer in the middle may be an EL for the layers below it, such as the base layer or any intervening enhancement layers, and at the same time serve as a RL for the enhancement layers above it. Each layer in between the base layer and the top layer (or the highest layer) is may be used as a reference for inter-layer prediction by a higher layer and may use a lower layer as a reference for inter-layer prediction.

For simplicity, examples are presented in terms of just two layers: a BL and an EL; however, it should be well understood that the ideas and embodiments described below are applicable to cases with multiple layers, as well. In addition, for ease of explanation, the terms "frames" or "blocks" are often used. However, these terms are not meant to be limiting. For example, the embodiments described below can be used with a variety of video units, including but not limited to pixels, blocks, slices, frames, picture, etc.

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. The video devices may transmit, receive, encode, decode, and/or store digital video information more efficiently by implementing embodiments described herein.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264

(also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as "HEVC WD" hereinafter, is available from http://phenix.int-evry.fr/jct/doc_end_user/documents/15_Geneva/wg11/JCTVC-O1003-v1.zip. The multi-view extension to HEVC, namely MV-HEVC, and another HEVC extension for more advanced 3D video coding (3D-HEVC) are being developed by the JCT-3V, and meanwhile, the scalable video coding extension to HEVC, namely SHVC, is being developed by the JCT-VC. A recent Working Draft (WD) of MV-HEVC, referred to as MV-HEVC WD5 hereinafter, is available from http://phenix.it-sudparis.eu/jct2/doc_end_user/documents/6_Geneva/wg11/JCT3V-F1004-v6.zip. The latest WD of 3D-HEVC, referred to as 3D-HEVC WD1 hereinafter, is available from http://phenix.it-sudparis.eu/jct2/doc_end_user/documents/6_Geneva/wg11/JCT3V-F1001-v3.zip. A recent Working Draft (WD) of SHVC and referred to as SHVC WD3 hereinafter, is available from http://phenix.it-sudparis.eu/jct/doc_end_user/documents/15_Geneva/wg11/JCTVC-O1008-v3.zip.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than a base layer. For example, the spatial aspect ratio between EL and BL can be 1.0, 1.5, 2.0 or other different ratios in vertical and horizontal directions. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In SVC, which refers to the SVC extension for H.264 or the SHVC extension for H.265 (as discussed above), prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information (including motion vectors) of the base layer to predict motion in the enhancement layer. Inter-layer residual prediction uses the residue of the base layer to predict the residue of the enhancement layer.

Overview

In SHVC, if a reference layer picture size is different from the enhancement layer picture size, a resampling (or upsampling) process can be applied to the reference layer picture to match the size of the enhancement layer picture for inter-layer prediction. To resample the reference layer picture, an N tap resampling filter can be applied for each color component. In the filtering process, the sample (or pixel) magnitudes of the reference layer picture can be multiplied by filter coefficients and summed up. Since the size of the reference layer picture and the size of the enhancement layer picture are different, the coordinates of the reference layer samples involved in the filtering process may be defined. For example, the sample location of the reference layer picture that corresponds to the sample location of the current enhancement layer picture can be determined so that sample(s) indicated by the sample location of the reference layer picture can be used in the resampling process.

High level syntax-only (HLS-only) scalable video coding enables video blocks in a current layer to be predicted using video blocks from a reference layer without introducing low-level changes to the HEVC coding specification. For example, HLS-only SVC enables such coding by using existing inter coding techniques with reference layers from the same access unit of the current layer. Some techniques may enable multiple reference layers to be identified for possible use in inter-layer coding.

In some implementations, SHVC does not support scalable video coding with the base layer containing field pictures coded based on H.264/AVC while the enhancement layer includes frame pictures coded based on SHVC. However migration from 1080i to 1080p with SHVC can be used, for example, in broadcasting since the H.264/AVC 1080i bitstreams may be widely used. In addition, this is also useful when different layers have distinct color formats, such as base layer having YUV420 format and an adjacent layer having YUV422 or YUV 444 color format. To support those functionalities, the upsampling process of SHVC can be modified.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. The source device 12 generates encoded video data. The destination device 14 may decode the encoded video data generated by source device 12. The source device 12 can provide the video data to the destination device 14 via a communication channel 16, which may include a computer-readable storage medium or other communication channel. The source device 12 and the destination device 14 may include a wide range of devices, including desktop computers, notebook (e.g., laptop) computers, tablet computers, set-top boxes, telephone handsets, such as so-called "smart" phones, so-called "smart" pads, televisions, cameras, display devices, digital media players, video gaming consoles, in-car computers, video streaming devices, or the like. The source device 12 and destination device 14 may be equipped for wireless communication.

The destination device 14 may receive the encoded video data to be decoded via the communication channel 16. Communication channel 16 may comprise a type of medium or device capable of moving the encoded video data from the source device 12 to the destination device 14. For example, the communication channel 16 may comprise a communication medium to enable the source device 12 to transmit encoded video data directly to the destination device 14 in real-time. The encoded video data may be modulated according to a communication standard, such as a wireless communication protocol, and transmitted to the destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from the source device 12 to the destination device 14.

In some embodiments, encoded data may be output from an output interface 22 to a storage device. In such examples, the channel 16 may correspond to a storage device or computer-readable storage medium that stores the encoded video data generated by the source device 12. For example, the destination device 14 may access the computer-readable storage medium via disk access or card access. Similarly, encoded data may be accessed from the computer-readable storage medium by an input interface 28. The computer-readable storage medium may include any of a variety of distributed or locally accessed data storage media such as a hard drive, Blu-ray discs, DVDs, CD-ROMs, flash memory, volatile or non-volatile memory, or other digital storage media for storing video data. The computer-readable storage medium may correspond to a file server or another intermediate storage device that may store the encoded video generated by the source device 12. The destination device 14 may access stored video data from the computer-readable storage medium via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. The destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the computer-readable storage medium may be a streaming transmission, a download transmission, or a combination of both.

The embodiments in this disclosure can apply to applications or settings in addition to wireless applications or settings. The embodiments may be applied to video coding in support of a of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some embodiments, the system 10 may be configured to support one-way or two-way video transmission to support applications such as video streaming, video playback, video broadcasting, and/or video telephony.

In FIG. 1, the source device 12 includes the video source 18, the video encoder 20, and the output interface 22. The destination device 14 includes an input interface 28, video decoder 30, and display device 32. The video encoder 20 of the source device 12 may be configured to apply the techniques for coding a bitstream including video data conforming to multiple standards or standard extensions. In other embodiments, the source device 12 and the destination 14 device may include other components or arrangements. For example, the source device 12 may receive video data from an external video source 18, such as an external camera. Likewise, the destination device 14 may interface with an external display device, rather than including an integrated display device.

The video source 18 of the source device 12 may include a video capture device, such as a video camera, a video archive containing previously captured video, and/or a video feed interface to receive video from a video content provider. The video source 18 may generate computer graphics-based data as the source video, or a combination of live video, archived video, and computer generated video. In some embodiment, if the video source 18 is a video camera, the source device 12 and the destination device 14 may form so-called camera phones or video phones. The captured, pre-captured, or computer-generated video may be encoded by the video encoder 20. The encoded video information may be output by the output interface 22 to a communication channel 16, which may include a computer-readable storage medium, as discussed above.

Computer-readable storage medium may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from the source device 12 and provide the encoded video data to the destination device 14 (e.g., via network transmission). A computing device of a medium production facility, such as a disc stamping facility, may receive encoded video data from the source device 12 and produce a disc containing the encoded video data. Therefore, the communication channel 16 may be understood to include one or more computer-readable storage media of various forms.

The input interface 28 of the destination device 14 can receive information from the communication channel 16. The information of the communication channel 16 may include syntax information defined by the video encoder 20, which can be used by video decoder 30, that includes syntax elements that describe characteristics and/or processing of blocks and other coded units, e.g., a group of pictures (GOPs). The display device 32 displays the decoded video data to a user, and may include any of a variety of display devices such as a cathode ray tube (CRT), a liquid crystal display (LCD), a plasma display, an organic light emitting diode (OLED) display, or another type of display device.

The encoder 20 and the video decoder 30 may operate according to a video coding standard, such as the High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG 4, Part 10, Advanced Video Coding (AVC), or extensions of such standards. The embodiments in this disclosure, however, are not limited to any particular coding standard. Other examples of video coding standards include MPEG-2 and ITU-T H.263. Although not shown in FIG. 1A, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

FIG. 1 is an example of a video coding/decoding system and the embodiments in this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

The video encoder 20 and the video decoder 30 each may be implemented as any of a variety of suitable encoder circuitry, such as one or more processors or microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the embodiments in this disclosure. Each of the video encoder 20 and the video decoder 30 may be included in one or more encoders or decoders, either of which may be integrated as part of a combined encoder/decoder (CODEC) in a respective device. A device including the video encoder 20 and/or the video decoder 30 may comprise an integrated circuit, a microprocessor, and/or a wireless communication device, such as a cellular telephone.

Coding Structure of Scalable Video Coding (SVC)

Figure 2:
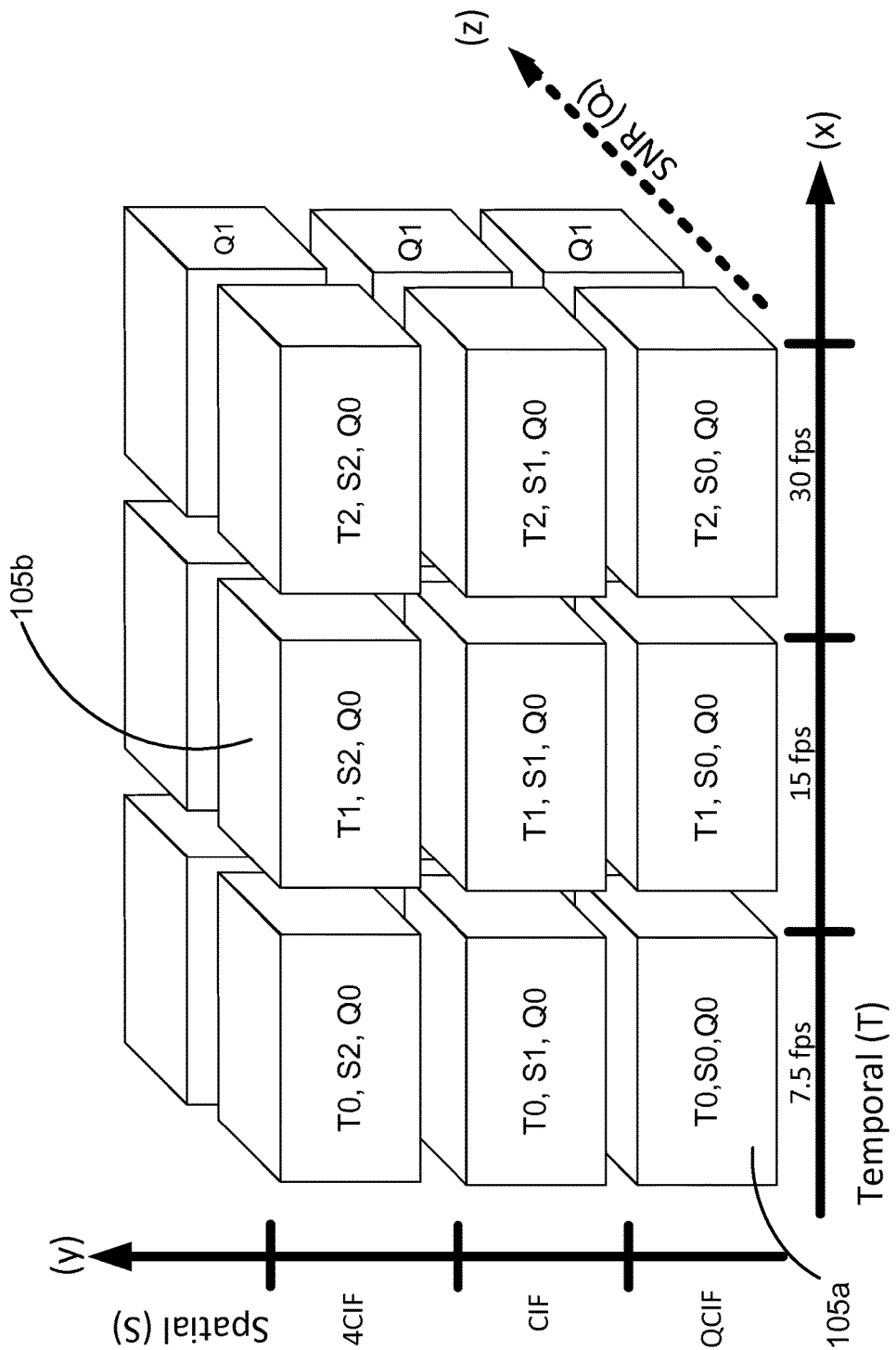
FIG. 2 is a diagram depicting an example of scalabilities in different dimensions.

FIG. 2 is a diagram depicting an example of scalabilities in different dimensions. The scalabilities may be applied to data encoded or transferred from the encoder 21 to the decoder 31, as discussed above. As shown, the scalabilities are enabled in three dimensions: time, space, and quality, or Signal to Noise Ratio (SNR). In an implementation, temporal scalability (T), denoted by the time dimension along the horizontal (x) axis, may support various frame rates, for example, 7.5 Hz, 15 Hz or 30 Hz, as shown. The vertical (y) axis shows spatial scalability (S), for example the screen size. In an implementation, spatial scalability supports different resolutions such as, for example, Common Intermediate Format (CIF), Quarter Common Intermediate Format (QCIF), and Four Quarter Common Intermediate Format (4CIF). For each specific spatial resolution and frame rate, the SNR (Q) layers can be added to improve the picture quality. As shown, SNR is represented along the z axis.

SVC standardizes the encoding of a high-quality video bitstream that also contains one or more subset bitstreams. A subset video bitstream may be derived by dropping packets from the larger video bitstream to reduce the bandwidth required for the subset bitstream. The subset bitstream can represent a lower spatial resolution (smaller screen), lower temporal resolution (lower frame rate), or lower quality video signal. Once video content has been encoded in such a scalable way, an extractor tool at the decoder may be used to adapt the actual delivered content according to application requirements, which may be dependent, for example, on the client(s) or the transmission channel. As a non-limiting example, this may allow a user to view a lower resolution version of a video extracted from very high resolution transmission on a mobile device.

In the example shown in FIG. 2, a plurality of cubes 105 are shown, distributed based on T, S, and Q values. As shown, only cubes 105a and 105b are labeled to preserve figure clarity.

Each of the cubes 105 is representative of pictures or video having the same frame rate (e.g., the temporal level), spatial resolution, and SNR layers. Each of the cubes 105 is depicted having a value for T, S, and Q (e.g., 0, 0, 0) depending on the encoded layer. For example, the cube 105a has T0, S0, Q0 indicating a single layer (e.g., the base layer, or layer 0) for each of the three scalabilities. As another non-limiting example, the cube 105b annotated as "T1, S2, Q0," indicating a second layer in T, a third layer in S, and the base layer in Q.

Better representation of the coded images or video described by the cubes 105 can be achieved by adding additional cubes 105 (pictures) in any of the three exemplary dimensions. Combined scalability may be supported when there are two, three (as shown) or even more scalabilities implemented.

Generally, the pictures having the lowest spatial and quality layer are compatible with a single layer video codec, and the pictures at the lowest temporal level such as the cube 105a, form the temporal base layer, which can be enhanced with pictures at higher temporal levels. In addition to the base layer, several spatial and/or SNR enhancement layers (EL) can be added to provide further spatial and/or quality scalabilities. As noted above, SNR scalability may also be referred as quality (Q) scalability. Each spatial or SNR enhancement layer may be temporally scalable, with the same temporal scalability structure as the base layer. For one spatial or SNR enhancement layer, the lower layer it depends on is also referred as the base layer (BL) of that specific spatial or SNR enhancement layer.

Figure 3:
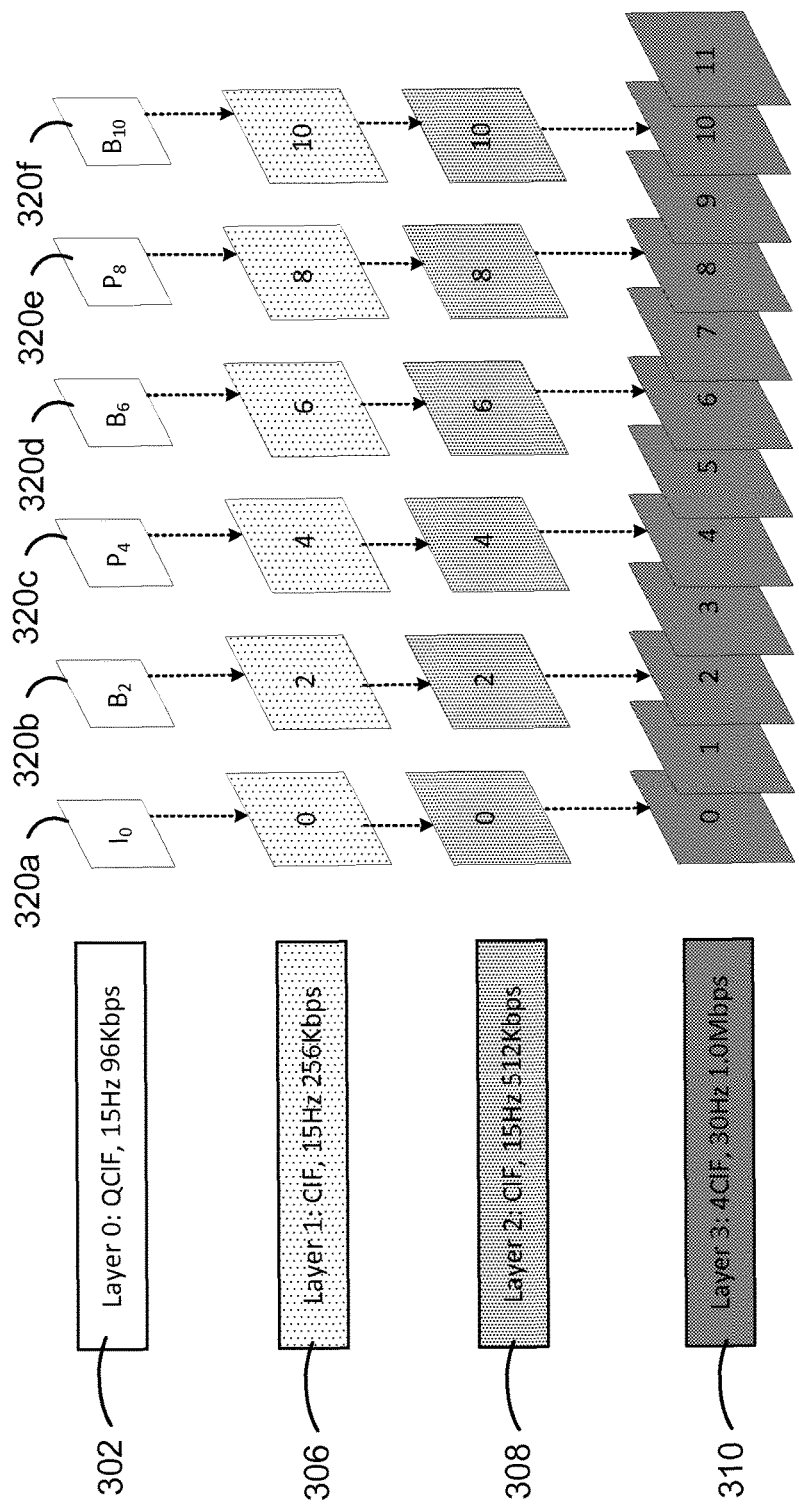
FIG. 3 illustrates an example of SVC coding structure.

FIG. 3 illustrates an example of SVC coding structure. Such a coding structure may be implemented by the encoder 21 or the decoder 31 as disclosed herein. As shown, a base layer 302 may have the lowest spatial and quality layer (for example, the pictures in layer 0 and layer 1 of FIG. 2, having QCIF resolution and a 7.5 Hz frame rate and 64 Kbps bit rate. In at least one implementation, QCIF images or videos are 176 pixels wide and 144 pixels tall (176×144 pixels). The name Quarter CIF is written as QCIF and the resolution is one quarter the size of CIF resolution (352×288 pixels). QCIF is smaller than CIF, QVGA, and VGA.

Those pictures of the lowest temporal level form the temporal base layer 302, as shown in layer 0 of FIG. 3. The base layer 302 (and subsequent enhancement layers described below) may include a plurality of coded slices or frames, depending on the compression protocol. The layer 0 302 may include a series of frames, starting with an i-frame "$I_0$." Frame $I_0$ may also be referred to herein as a frame 320a. As shown, the frame 320a is an I-frame, or intra-coded picture, for example. Accordingly the subsequent frames 320b-320f may include a B (bi-predicted picture) frame or a P frame (predicted picture) in order to encode the image data.

The temporal base layer 302 (layer 0) can be enhanced with pictures of higher temporal levels, such as a layer 1 304 (the second layer) increasing the frame rate to 15 Hz and bit rate to 96 Kbps. In addition to the base layer 302, several spatial and/or SNR enhancement layers can be added to provide spatial and/or quality scalabilities. For instance, an enhancement layer 2 306 may be added, having an increased bit rate of 256 Kbps while maintaining the same spatial resolution (CIF) as in the layer 1 304.

In some implementations, a layer 2 308 (the third layer) can further be added as a CIF representation of the image data with the same resolution as layer 2 304. In the example of FIG. 3, the layer 3 308 may be an SNR enhancement layer. As shown in this example, each spatial or SNR enhancement layer 306, 308 may be temporally scalable, with the same temporal scalability structure as the base layer 302.

In some implementations, an enhancement layer can enhance both spatial resolution and frame rate. As shown, a layer 3 310 (the fourth layer) may provide a 4CIF enhancement layer, which further increases the frame rate from 15 Hz to 30 Hz, doubling for example, the number of slices or frames transmitted. 4CIF may generally be defined as being four times the size of CIF, or 704×576 pixels.

Figure 4:
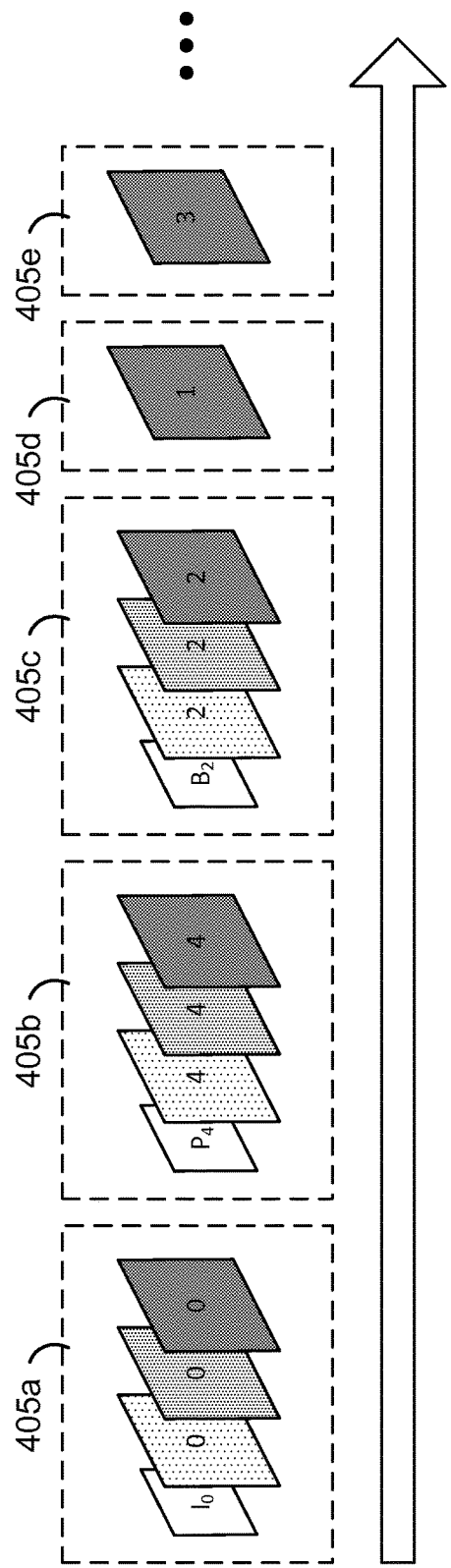
FIG. 4 is a graphical representation of a plurality of access units (AU) in a bitstream.

FIG. 4 s a graphical representation of a plurality of access units (AUs) in a bitstream. As shown, a plurality of AUs 405 may be formed from the coded slices 320 described in connection with FIG. 3. Each of the coded slices 320 in the same time instance are successive in the bitstream order and form one access unit 405 in the context of SVC. Those SVC access units 405 then follow the decoding order, which may be different from the display order. The decoding order may further be decided, for example, by the temporal prediction relationship between the slices 320 within the AUs 405.

HEVC SVC Extension—High Level Syntax Only SHVC

In some implementations, such as high-level syntax only SHVC, there is no new block level coding tool when compared to HEVC single layer coding. Slice and above level syntax changes and picture level operation, such as picture filtering or up-sampling, are desirable in this approach, such as that shown below in the two layer SHVC encoder of FIG. 5A and FIG. 5B.

The syntax elements that describe the structure of the bitstream or provide information that applies to multiple pictures or to multiple coded block regions within a picture, such as the parameter sets, reference picture management syntax, and supplementary enhancement information (SEI) messages, are known as "high-level syntax" part of HEVC.

The high-level syntax provides the encapsulation for the coded video for further processing. The high level syntax includes the structure of the bitstream as well as signaling of high-level information that applies to one or more entire slices of pictures of a bitstream. In some implementations, the high-level syntax indicates the spatial resolution of the video, which coding tools might be employed, and describes certain random access functionalities of the bitstream. In addition to the signaling of syntax elements, the high-level tool decoding processes associated with the syntax elements are also considered to be included in high level syntax. For example, high-level syntax decoding processes may include reference picture management and the output of decoded pictures.

To reduce the redundancy between layers, up-sampled collocated reference layer picture(s) (e.g., an inter-layer reference (ILR) picture) may be put into a memory or a memory unit, such as a reference buffer (e.g., a reference frame memory, described below) of the enhancement layer so that inter-layer prediction is achieved in the same way as inter-frame prediction in the same layer. In certain implementations, the ILR picture may be marked as a long term reference picture. The motion vector difference of inter-layer reference may be constrained to 0.

Figure 5A:
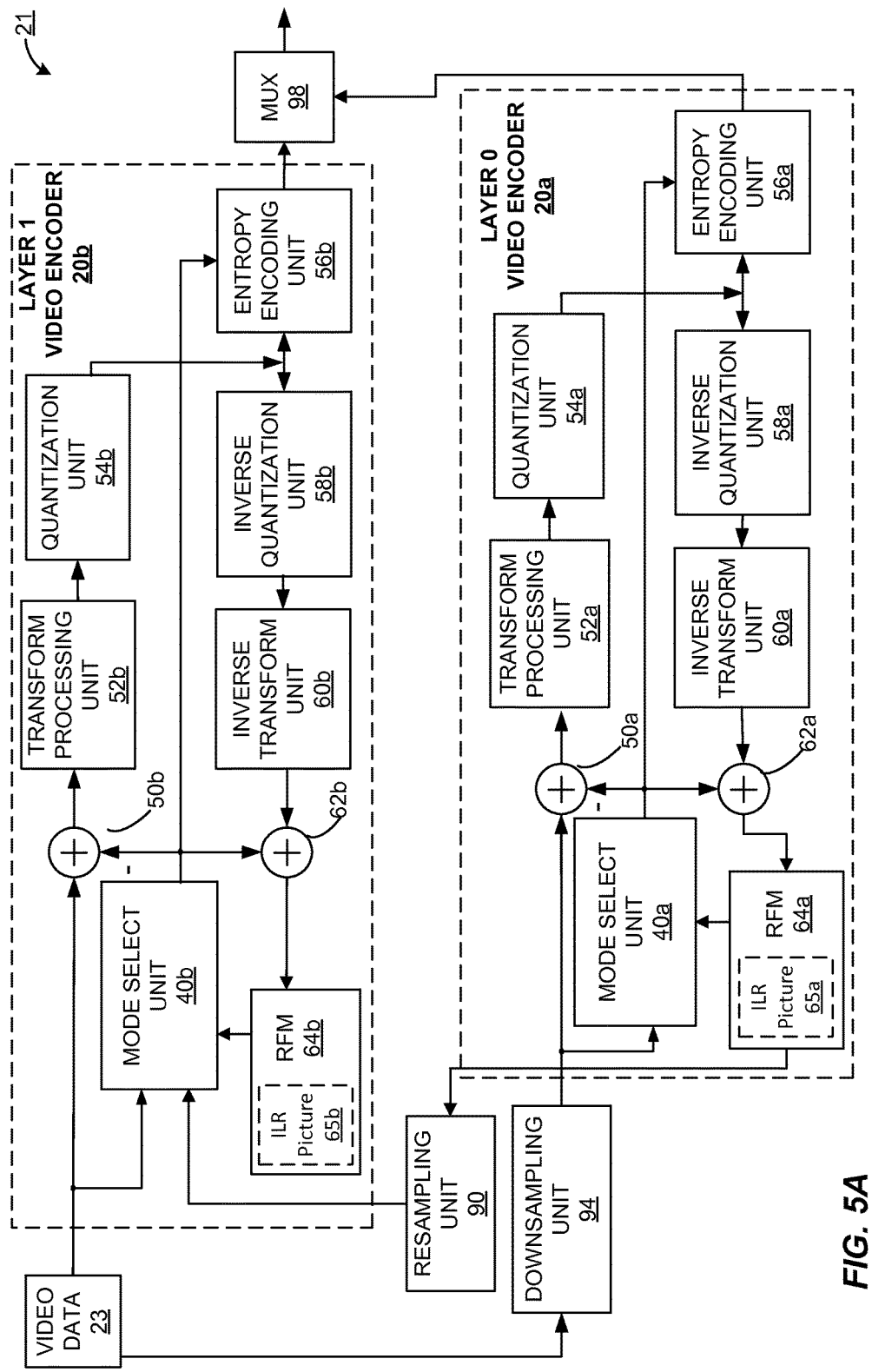
FIG. 5A is a functional block diagram of a multi-layer video encoder.

FIG. 5A is a functional block diagram of a multi-layer video encoder. As shown, a multi-layer video encoder ("video encoder" or "encoder") 21 that may implement techniques in accordance with aspects described in this disclosure. The video encoder 21 may be configured to process multi-layer video frames, such as for SHVC and multiview coding. Further, the video encoder 21 may be configured to perform any or all of the embodiments in this disclosure.

The video encoder 21 includes a video encoder 20a and video encoder 20b, each of which may be configured as the video encoder 20 of FIG. 1A, also indicated by the reuse of reference numerals. The video encoder 21 is shown including two video encoders 20A and 20B, however the video encoder 21 may include any number of video encoder 20 layers. In some embodiments, the video encoder 21 may include a video encoder 20 for each picture or frame in an access unit 405 (FIG. 4). For example, the access unit 405 that includes four pictures may be processed or encoded by a video encoder that includes four encoder layers 20. In some embodiments, the video encoder 21 may include more encoder layers than frames in an access unit (e.g., the access unit 405). In some such cases, some of the video encoder layers may be inactive when processing some access units 405.

The encoders 20a, 20b (collectively, "video encoders 20") of FIG. 5A each illustrate a single layer of a codec. However, some or all of the video encoders 20 may be duplicated for processing according to a multi-layer codec.

The video encoders 20 may perform intra-layer and inter-layer prediction (sometime referred to as intra-, inter- or inter-layer coding) of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-layer coding relies on prediction based upon video within a different layer(s) within the same video coding sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 5A, the video encoders 20 receive a current video block within a video frame to be encoded. In the implementation shown, the video encoder 20 includes a mode select unit 40, a reference frame memory ("RFM") 64, a summer 50, a transform processing unit 52, a quantization unit 54, and an entropy encoding unit 56. The mode select unit 40, in turn, may include a motion compensation unit, a motion estimation unit, an intra-prediction unit, an inter-layer prediction unit, and a partition unit. The individual components are not depicted for brevity, but their individual functions are discussed in relation to the mode select unit 40.

The RFM 64 may include a decoded picture buffer ("DPB"). The DPB is a broad term having its ordinary meaning, and in some embodiments refers to a video codec-managed data structure of reference frames. The RFM 64 may be further configured to store an ILR picture 65, labeled in dashed lines. The ILR picture 65 may provide a reference for inter-layer prediction.

For video block reconstruction, the video encoders 20 may also include an inverse quantization unit 58, an inverse transform unit 60, and a summer 62. In some implementations, a deblocking filter (not shown in FIG. 5A) may also be included to filter block boundaries to remove blockiness artifacts from reconstructed video. If desired, the deblocking filter may filter the output of the summer 62. Additional filters (in loop or post loop) may also be used in addition to the deblocking filter. Such filters are not shown for brevity, but if implemented, may filter the output of summer 50 (as an in-loop filter).

During the encoding process, the video encoders 20 receive certain video data 23, such as a video frame or slice to be coded. The frame or slice may be divided into multiple video blocks. The motion estimation unit and motion compensation unit, as a function of the mode select unit 40, may perform inter-predictive coding of the received video block relative to one or more blocks in one or more reference frames to provide temporal prediction. The intra-prediction unit may alternatively perform intra-predictive coding of the received video block relative to one or more neighboring blocks in the same frame or slice as the block to be coded to provide spatial prediction. The video encoders 20a, 20b may perform multiple coding passes, for example, to select an appropriate coding mode for each block of video data.

Additionally, the partition unit also within the mode select unit 40, may partition blocks of video data into sub-blocks, based on evaluation of previous partitioning schemes in previous coding passes.

In addition to the video encoders 20a and 20b, the video encoder 21 may include a resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the mode select unit 40 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit 405 (FIG. 4), in some cases, the resampling unit 90 may downsample a layer. For example, if during streaming of a video, the bandwidth is reduced, a frame may be downsampled instead of upsampled. Resampling unit 90 may be further configured to perform cropping and/or padding operations, as well.

The resampling unit 90 may be configured to receive a picture (e.g., the ILR picture 65) or frame (or picture information associated with the picture) from the RFM 64 of the lower layer encoder 20a and to upsample the picture (or the received picture information). In some embodiments, the received picture is an inter-layer reference picture stored within the RFM 64. The upsampled picture may then be provided to the mode select unit 40 of a higher layer encoder 20b configured to encode a picture in the same access unit as the lower layer encoder. In some cases, the higher layer encoder 20b is one layer removed from the lower layer encoder 20a. In other cases, there may be one or more higher layer encoders 20b between the layer 0 video encoder 20s and the layer 1 encoder 20b of FIG. 5A.

In some cases, the resampling unit 90 may be omitted or bypassed. In such cases, the picture from the RFM 64a (e.g., the ILR picture 65a) of the video encoder 20a may be provided directly, or at least without being provided to the resampling unit 90, to the mode select unit 40b of the video encoder 20b. For example, if video data provided to the video encoder 20b and the reference picture from the decoded picture buffer 64a of the video encoder 20a are of the same size or resolution, the reference picture may be provided to the video encoder 20b without any resampling.

In some embodiments, the video encoder 21 downsamples video data to be provided to the lower layer encoder using the downsampling unit 94 before provided the video data to the video encoder 20a. Alternatively, the downsampling unit 94 may be a resampling unit 90 capable of upsampling or downsampling the video data. In yet other embodiments, the downsampling unit 94 may be omitted.

As illustrated in FIG. 5A, the video encoder 21 may further include a multiplexor ("mux") 98. The mux 98 can output a combined bitstream from the video encoder 21. The combined bitstream may be created by taking a bitstream from each of the video encoders 20a and 20b and alternating which bitstream is output at a given time. While in some cases the bits from the two (or more in the case of more than two video encoder layers) bitstreams may be alternated one bit at a time, in many cases the bitstreams are combined differently.

Figure 5B:
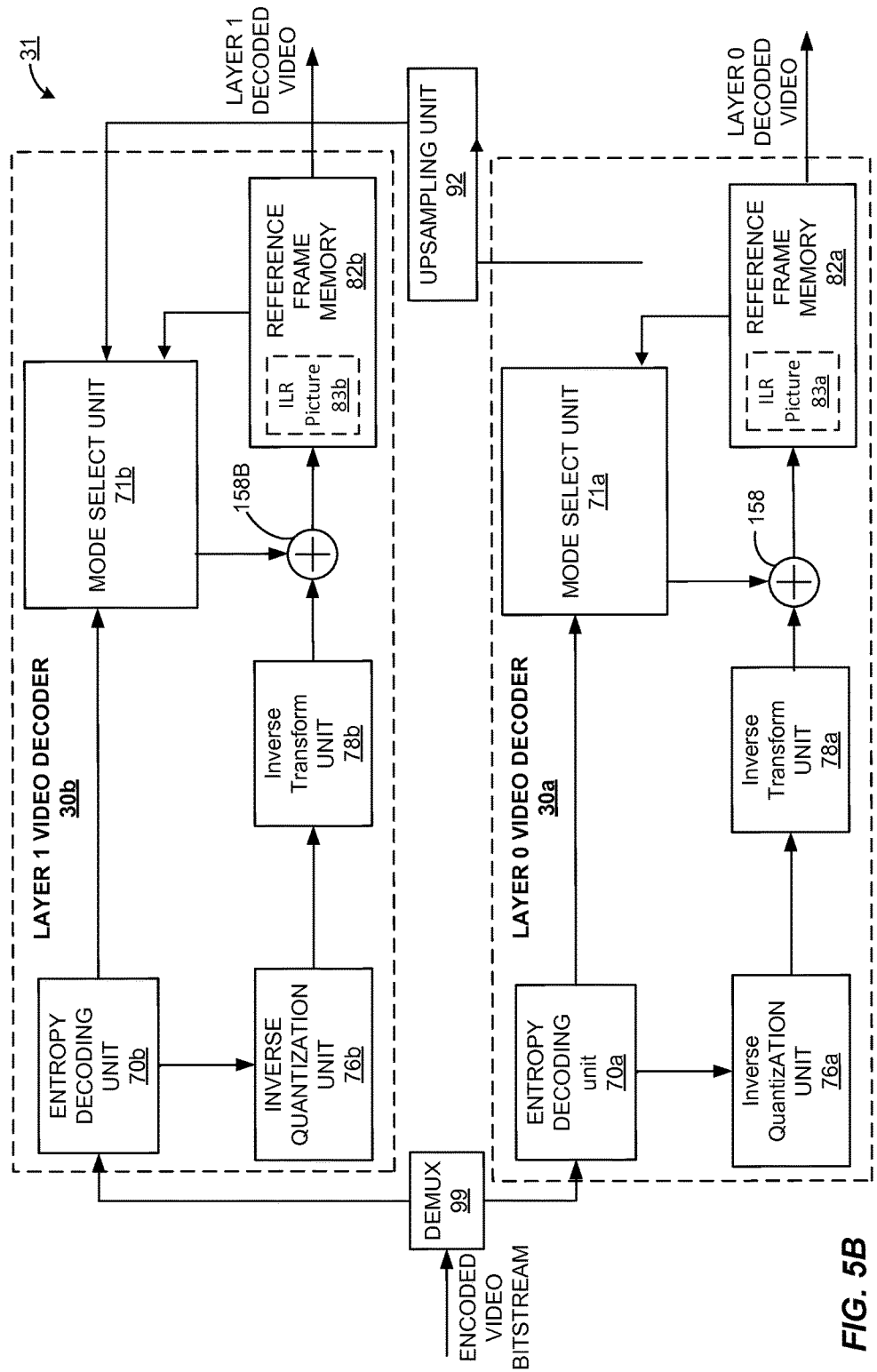
FIG. 5B is a functional block diagram of a multi-layer video decoder.

FIG. 5B is a functional block diagram of a multi-layer video decoder. As shown, a multi-layer decoder ("decoder" or "video decoder") 31 may be configured to process multi-layer video frames, such as for SHVC and multiview coding. Further, the video decoder 31 may be configured to perform any or all of the embodiments in this disclosure.

In some implementations, the video decoder 31 includes a video decoder 30a and video decoder 30b, each of which may be configured as the video decoder 30 of FIG. 1A. Further, as indicated by the reuse of reference numbers, the video decoders 30a and 30b may include at least some of the systems and subsystems as the video decoder 30. Although the video decoder 31 is illustrated as including two video decoders 30a and 30b, the video decoder 31 may include any number of video decoder 30 layers. In some embodiments, the video decoder 31 may include a video decoder 30 for each picture or frame in an access unit 405 (FIG. 4). For example, the access unit 405 that includes four pictures may be processed or decoded by a video decoder that includes four decoder layers. In some embodiments, the video decoder 31 may include more decoder layers than frames in the access unit 405. In some such cases, some of the video decoder layers may be inactive when processing some access units, for example access units 405d, 405e.

The video decoder 31 may further include an upsampling unit 92. In some embodiments, the upsampling unit 92 may upsample a base layer of a received video frame to create an enhanced layer to be added to the reference picture list for the frame or access unit 405. This enhanced layer can be stored in the reference frame memory ("RFM") 82 (e.g., in its decoded picture buffer, etc.). In some embodiments, the upsampling unit 92 can include some or all of the embodiments described with respect to the resampling unit 90 of FIG. 5A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame. The RFM 82 may be further configured to store an ILR picture 83, similar to the ILR picture 65. The ILR picture 83 is shown in dashed lines indicating its storage within the RFM 82. The ILR picture 83 may be further utilized in inter-layer prediction as described above.

The upsampling unit 92 may be configured to receive a picture or frame (or picture information associated with the picture) from the RFM 82 of the lower layer decoder (e.g., the video decoder 30a) and to upsample the picture (or the received picture information). This upsampled picture (e.g., the ILR picture 83a) may then be provided to the mode select unit 71b of a higher layer decoder (e.g., the video decoder 30b) configured to decode a picture in the same access unit 405 as the lower layer decoder. In some cases, the higher layer decoder 30b is one layer removed from the lower layer decoder 30a. In other cases, there may be one or more higher layer decoders between the layer 0 decoder 30a and the layer 1 decoder 30b.

In some cases, the upsampling unit 92 may be omitted or bypassed. In such cases, the picture (e.g., the ILR picture 83a) from the RFM 82a of the video decoder 30a may be provided directly, or at least without being provided to the upsampling unit 92, to the mode select unit 71b of the video decoder 30b. For example, if the video data provided to the video decoder 30b and the reference picture from the RFM 82 of the video decoder 30a are of the same size or resolution, the reference picture may be provided to the video decoder 30b without upsampling. Further, in some embodiments, the upsampling unit 92 may be a resampling unit 90 configured to upsample or downsample a reference picture received from the RFM 82 of the video decoder 30a.

The video decoder 31 may further include a demultiplexor ("demux") 99. The demux 99 can split a multiplexed or encoded video bitstream into multiple bitstreams with each bitstream output by the demux 99 being provided to a different video decoder 30a and 30b. The multiple bitstreams may be created by receiving a bitstream and each of the video decoders 30a and 30b receives a portion of the bitstream at a given time.

Re-Sampling Process in SHVC

In some implementations of spatial scalability, the base layer picture and the enhancement layer picture may have different sizes or resolutions. For example, in 2× (two times) spatial scalability, the width of the base layer picture is half of that of the enhancement layer picture, and the height of the base layer picture is half of that of the enhancement layer picture. In one example, the base layer sequence may be generated by applying down-sampling of the original sequences. In such an implementation, the enhancement layer sequence may be the original sequence. To perform the inter-layer texture prediction, up-sampling may be applied to the reconstructed base layer picture. Such a process or method may be applied to one of the ILR pictures 65 (FIG. 5A) or the ILR pictures 83 (FIG. 5B), for example.

A resampling filter may downsample at different sampling locations. For luma down-sampling, two sampling locations are shown in the following FIG. 6 and FIG. 7. As generally referred to in FIG. 6, FIG. 7, and FIG. 8, the diagrams depict example pixel locations of a base layer picture and an enhancement later picture. Unless discussed otherwise, the enhancement layer pixels are indicated by white squares, while the base layer pixels are indicated by solid circles.

FIG. 6 is a graphical representation of symmetrical down sampling of enhancement layer luma samples. As shown, an array 600 includes a plurality of enhancement layer luma samples 602 that are down-sampled from a corresponding set of pixels to a lower spatial resolution. The exemplary array 600 includes a 4×4 array of enhancement layer luma samples 602. The resolution of the down-sampled enhancement layer luma samples 602 is then notionally one-quarter of the resolution, as indicated by a plurality of base layer luma samples 610 (e.g., half of the vertical and half of the horizontal resolution). The base layer luma samples 610 are shown in a 2×2 array 605. The array 605 is indicated by the dotted arrow and dotted box including the base layer luma samples 610.

In FIG. 6, the 4×4 array 600 of enhancement layer luma samples 602 may be derived from an enhancement layer, for example, from one of the enhancement layers 306, 308, 310 (FIG. 3). In the implementation shown, the 4×4 array of the enhancement layer luma samples 602 is down-sampled into the 2×2 array 605 in a base layer.

In certain implementations, the two arrays 600, 605 may have the same center position 620. As a result, the downsampled 2×2 array 605 may include the base layer luma samples 610 which may individually have a certain phase offset 650 from the enhancement layer luma samples 602. As shown, the phase offset 650 may have a horizontal component 650a and a vertical component 650b. The horizontal component 650a and vertical component 650b may be referred to collectively herein as the "phase," "offset," or "phase offset." The "phase," or "phase offset" is described below with reference to luma and chroma references in other examples.

In the one-quarter resolution down-sampling shown in FIG. 6, the base layer luma samples 610 may be located in the middle of four surrounding enhancement layer luma samples 602. For example, the downsampled luma sample 610a, is surrounded by the enhancement layer luma samples 602a, 602b, 602e, 602f. Thus the phase offset 650 may then be half of the distance between the adjacent pixels, for example, referenced from the enhancement layer luma sample 602a. Accordingly, the base layer luma samples 610 may have an average or mean value or position of the four surrounding enhancement layer pixels 602a, 602b, 602e, 602f.

FIG. 7 is a graphical representation of zero-phase downsampling. As shown, a plurality of enhancement layer luma samples 602 are again shown in a 4×4 array 700. However, in FIG. 7, the spatial distance, or phase (e.g. the phase offset 650), between the left-top luma sample 602a in the enhancement layer and the left-top base layer luma sample 710a is zero (0). The term "phase" generally refers to the spatial distance between the left-top sample in the enhancement layer and the left-top sample in the base layer; hence the term "zero-phase." As the implementation described by FIG. 7 is 2× downsampling, the base layer luma sample 710b also coincides with the enhancement layer luma sample 602c. Accordingly, the center position (e.g., the center position 620 of FIG. 6) moves to a center position 750, which is also collocated with the enhancement layer luma sample 602f.

In certain implementations, such as those described in connection with FIG. 6 and FIG. 7 above and FIG. 8 below, the square shapes indicate the locations of luma samples 602, 702 taken from the enhancement layer pixels, whereas the round shapes indicate the locations of down-sampled pixels, which may ultimately form the base layer picture.

Figure 8:
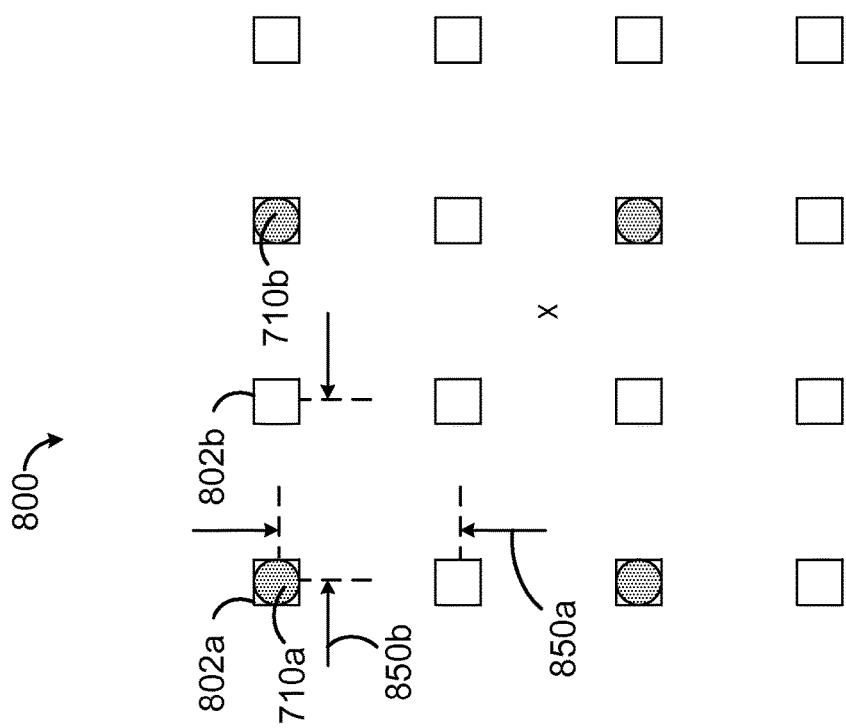
FIG. 8 is a graphical representation of an implementation of up-sampling locations in zero phase down-sampling.

FIG. 8 is a graphical representation of an implementation of up-sampling locations in zero phase down-sampling. As shown, a 4×4 array 800 including a plurality of pixels 802 is shown in a similar manner to the luma samples 602 (FIG. 6) and luma samples 702 (FIG. 7).

In certain implementations, in order to accurately recreate the image images being transmitted, the down-sampling location and phase information for each pixel is needed in the decoding and up-sampling process. For example, in the zero phase down-sampling shown in FIG. 7, the enhancement layer pixels 802a, 802b may also need to be up-sampled from the base layer pixels 710 (e.g., the pixels that were down-sampled in FIG. 7). Since the pixel 802a and the pixel 710a are collocated, the phase of the up-sampling filter for generating the pixel 802a is zero (0). However, similar to the phase 650, because the pixel 802b is at the mid-point of the pixel 710*a* and the pixel 710*b*, a phase 850 of one half the distance must be applied in the up-sampling filter for generating the pixel 802*b*.

Accordingly, in certain implementations, 2× spatial scalability with a zero-phase down-sampling filter results in a zero phase for some pixels 802*a* and one-half phase 850 for the pixels 802*b* of the up-sampling filter. The phase 850 of each pixel, luma sample, and/or chroma sample, may be required as described below.

Referring briefly back to FIG. 6, a similar method to the description of FIG. 8 may be applied to symmetric down-sampling. For example, a 2× spatial scalability in symmetric down-sampling may be require a different phase offset (e.g., the phase 650, 850) to upsample the array of luma samples 610. In particular, given the pixel locations resulting from the base layer luma samples 610, in order to up-sample to the enhancement layer pixels (e.g., the enhancement layer luma samples 602*a*), phase offsets of one-quarter and three-quarters, respectively, in both the vertical and horizontal directions may be required. For example, the luma sample 602*b* is one quarter the distance between the luma sample 610*a* and the luma sample 610*b*. Similarly, the luma sample 602*c* is three quarters the distance from the luma sample 610*a* to the luma sample 610*b*. The same measurements can be applied to the vertical and horizontal phases allowing upsampling from symmetrical phase downsampled pixels.

As noted above, in SHVC, if a reference layer picture size is different from the enhancement layer picture size, a resampling (or upsampling) process can be applied to the reference layer picture to match the size of the enhancement layer picture for inter-layer prediction. To resample the reference layer picture, an N tap resampling filter can be applied for each color component. The "N" may generally refer to the number of layers within codecs applied to the transmitted video. For example, an eight (8) tap filter may have eight encoder/decoder layers in the respective codec. This is discussed in more detail below in table 1 The following sections describe certain syntax and decoding processes for a given resampling process. In certain implementations, the syntax and decoding process for the resampling process in SHVC may be as follows. (see, e.g., working draft http://phenix.it-sudparis.eu/jct/doc_end_user/documents/15_Geneva/wg11/JCTVC-O1008-v3.zip).

Video Parameter Set Extension Syntax

The following description is related to a cross layer phase alignment flag, for example the syntax element "cross_layer_phase_alignment_flag," implemented during processes related to upsampling and downsampling video data (e.g., SHVC data). In certain embodiments, the cross_layer_phase_alignment_flag may be limited to having a binary value, for example, zero (0) or one (1).

Video Parameter Set Extension Semantics

In some embodiments, the cross_layer_phase_alignment_flag equal to 1 may specify that the locations of the luma sample grids of all layers are aligned at the center sample position of the pictures, as shown in FIG. 6. In other embodiments, a cross_layer_phase_alignment_flag equal to 0 may specify that the locations of the luma sample grids of all layers are aligned at the top-left sample position of the picture, as shown in FIG. 7. Thus, the phase or phase offset 650, 850 may vary according to the center position 620 or 750. Accordingly, related syntax elements may vary.

Derivation Process for Reference Layer Sample Location Used in Resampling

The resampling process may require certain inputs, including the phase or phase offset (e.g., x and y offset) from a reference point. This may be done for both luma and chroma samples of a video bitstream. Inputs to this process are a variable, cIdx, specifying the color component index, and a sample location (xP, yP) relative to the top-left sample (e.g., the sample 602*a* of FIG. 7) of the color component of the current picture specified by cIdx.

In some embodiments, output of this process is a sample location (xRef16, yRef16) specifying the reference layer sample location in units of 1/16-th sample relative to the top-left sample of the reference layer picture. For example, the top-left sample may be similar to the enhancement layer luma sample 602*a* of FIG. 6, FIG. 7, and FIG. 8. Thus, the 1/16-$^{th}$ sample may also correspond to 1/16-th of the distance between two adjacent pixels, or for example, the enhancement layer luma samples 602*a* and 602*b*.

The variables offsetX and offsetY are derived as follows:

$$\text{offsetX} = \text{ScaledRefLayerLeftOffset}/((c\text{Idx}==0)?1:\text{SubWidth}C) \quad \text{(H-3)}$$

$$\text{offsetY} = \text{ScaledRefLayerTopOffset}/((c\text{Idx}==0)?1:\text{SubHeight}C) \quad \text{(H-4)}$$

The variables phaseX, phaseY, addX and addY may be derived as follows:

$$\text{phaseX} = (c\text{Idx}==0)?(\text{cross\_layer\_phase\_alignment\_flag}<<1):\text{cross\_layer\_phase\_alignment\_flag} \quad \text{(H-5)}$$

$$\text{phaseY} = (c\text{Idx}==0)?(\text{cross\_layer\_phase\_alignment\_flag}<<1):\text{cross\_layer\_phase\_alignment\_flag}+1 \quad \text{(H-6)}$$

$$\text{addX} = (\text{ScaleFactorX}*\text{phaseX}+2)>>2 \quad \text{(H-7)}$$

$$\text{addY} = (\text{ScaleFactorY}*\text{phaseY}+2)>>2 \quad \text{(H-8)}$$

The variables xRef16 and yRef16 may be derived as follows:

$$x\text{Ref16} = (((xP-\text{offsetX})*\text{ScaleFactorX}+\text{addX}+(1<<11))>>12)-(\text{phaseX}<<2) \quad \text{(H-9)}$$

$$y\text{Ref16} = (((yP-\text{offsetY})*\text{ScaleFactorY}+\text{addY}+(1<<11))>>12)-(\text{phaseY}<<2) \quad \text{(H-10)}$$

Luma Sample Interpolation Process

The Luma sample interpolation process may require the luma reference sample array (e.g., the array 700 of FIG. 7) rlPicSample$_L$, and a luma sample location (xP, yP) relative to the top-left luma sample of the current picture.

In some embodiments, the output of this process is an interpolated luma sample value intLumaSample. The luma sample value intLumaSample may correspond to the location of the pixel 802*b* (FIG. 8).

A table H-1 is provided below, indicating possible 8-tap filter coefficients $f_L[p, x]$ with p=0 . . . 15 and x=0 . . . 7 used for the luma resampling process.

TABLE 1

16-phase luma resampling filter

Table 1: Interpolation Filter Coefficients (8-tap filter, 0-7)

| Phase p | $f_L$ [p, 0] | $f_L$ [p, 1] | $f_L$ [p, 2] | $f_L$ [p, 3] | $f_L$ [p, 4] | $f_L$ [p, 5] | $f_L$ [p, 6] | $f_L$ [p, 7] |
|---|---|---|---|---|---|---|---|---|
| 0 | 0 | 0 | 0 | 0 | 64 | 0 | 0 | 0 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |

TABLE 1-continued 16-phase luma resampling filter

Table 1: Interpolation Filter Coefficients (8-tap filter, 0-7)

| Phase p | $f_L$ [p, 0] | $f_L$ [p, 1] | $f_L$ [p, 2] | $f_L$ [p, 3] | $f_L$ [p, 4] | $f_L$ [p, 5] | $f_L$ [p, 6] | $f_L$ [p, 7] |
|---|---|---|---|---|---|---|---|---|
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

In some embodiments, the value of the interpolated luma sample IntLumaSample is derived by applying the following ordered steps:
1. The derivation process for reference layer sample location used in resampling as specified in subclause H.6.2 is invoked with cIdx equal to 0 and luma sample location (xP, yP) given as the inputs and (xRef16, yRef16) in units of 1/16-th sample as output.
2. The variables xRef and xPhase may be derived as follows:

$$xRef = (xRef16 >> 4) \quad (H\text{-}23)$$

$$xPhase = (xRef16)\% 16 \quad (H\text{-}24)$$

3. The variables yRef and yPhase may be derived as follows:

$$yRef = (yRef16 >> 4) \quad (H\text{-}25)$$

$$yPhase = (yRef16)\% 16 \quad (H\text{-}26)$$

4. The variables shift1, shift2 and offset may be derived as follows:

$$shift1 = RefLayerBitDepth_Y - 8 \quad (H\text{-}27)$$

$$shift2 = 20 - BitDepth_Y \quad (H\text{-}28)$$

$$offset = 1 << (shift2 - 1) \quad (H\text{-}29)$$

5. The sample value tempArray[n] with n=0 . . . 7, may be derived as follows:

$$yPosRL = \quad (H\text{-}30)$$
$$Clip3(0, RefLayerPicHeightInSamplesY - 1, yRef + n - 1)$$
$$refW = RefLayerPicWidthInSamplesY$$

$$tempArray[n] = \quad (H\text{-}31)$$
$$(f_L[xPhase, 0] * rlPicSample_L[Clip3(0, refW - 1, xRef - 3),$$
$$yPosRL] + f_L[xPhase, 1] *$$
$$rlPicSample_L[Clip3(0, refW - 1, xRef - 2), yPosRL] +$$
$$f_L[xPhase, 2] * rlPicSample_L[Clip3(0, refW - 1,$$
$$xRef - 1), yPosRL] + f_L[xPhase, 3] * rl$$
$$PicSsample_L[Clip3(0, refW - 1, xRef), yPosRL] +$$
$$f_L[xPhase, 4] * rlPicSample_L[$$
$$Clip3(0, refW - 1, xRef + 1), yPosRL] +$$
$$f_L[xPhase, 5] * rlPicSample_L[$$
$$Clip3(0, refW - 1, xRef + 2), yPosRL] +$$
$$f_L[xPhase, 6] * rlPicSaample_L[$$
$$Clip3(0, refW - 1, xRef + 3), yPosRL] +$$
$$f_L[xPhase, 7] * rlPicSample_L[$$
$$Clip3(0, refW - 1, xRef + 4), yPosRL]) >> shift1$$

6. The interpolated luma sample value intLumaSample may be derived as follows:

$$intLumaSample = (f_L[yPhase, 0] * tempArray[0] + \quad (H\text{-}32)$$
$$f_L[yPhase, 1] * tempArray[1] + f_L[yPhase, 2] *$$
$$tempArray[2] + f_L[yPhase, 3] * tempArray[3] +$$
$$f_L[yPhase, 4] * tempArray[4] + f_L[yPhase, 5] *$$
$$tempArray[5] + f_L[yPhase, 6] * tempArray[6] +$$
$$f_L[yPhase, 7] * tempArray[7] + offset) >> shift2$$

$$intLumaSample = Clip3(0, (1 << BitDepth_Y) - 1, intLumaSample) \quad (H\text{-}33)$$

Chroma Sample Interpolation Process

In a similar manner to the luma interpolation described above and referenced in FIG. 6, FIG. 7, and FIG. 8, chroma interpolation may require the chroma reference sample array rlPicSample$_C$, and a chroma sample location (xP$_C$, yP$_C$) relative to the top-left chroma sample of the current picture. The chroma interpolation may follow a similar process as the luma interpolation. The output of this process is a interpolated chroma sample value "intChromaSample."

Table 2 specifies the 4-tap filter coefficients f$_C$[p, x] with p=0 . . . 15 and x=0 . . . 3 used for the chroma resampling process.

TABLE 2

16-phase chroma resampling filter

Table 2: Interpolation Filter Coefficients

| Phase p | $f_C$ [p, 0] | $f_C$ [p, 1] | $f_C$ [p, 2] | $f_C$ [p, 3] |
|---|---|---|---|---|
| 0 | 0 | 64 | 0 | 0 |
| 1 | −2 | 62 | 4 | 0 |
| 2 | −2 | 58 | 10 | −2 |
| 3 | −4 | 56 | 14 | −2 |
| 4 | −4 | 54 | 16 | −2 |
| 5 | −6 | 52 | 20 | −2 |
| 6 | −6 | 46 | 28 | −4 |
| 7 | −4 | 42 | 30 | −4 |
| 8 | −4 | 36 | 36 | −4 |
| 9 | −4 | 30 | 42 | −4 |
| 10 | −4 | 28 | 46 | −6 |
| 11 | −2 | 20 | 52 | −6 |
| 12 | −2 | 16 | 54 | −4 |
| 13 | −2 | 14 | 56 | −4 |
| 14 | −2 | 10 | 58 | −2 |
| 15 | 0 | 4 | 62 | −2 |

The value of the interpolated chroma sample value intChromaSample is derived by applying the following ordered steps:
1. The derivation process for reference layer sample location in resampling is invoked with cIdx and chroma sample location (xP$_C$, yP$_C$) given as the inputs and (xRef16, yRef16) in units of 1/16-th sample as output.
2. The variables xRef and xPhase are derived as follows:

$$xRef = (xRef16 >> 4) \quad (H\text{-}34)$$

$$xPhase = (xRef16)\%16 \quad (H\text{-}35)$$

3. The variables yRef and yPhase are derived as follows:

$$yRef = (yRef16 >> 4) \quad (H\text{-}36)$$

$$yPhase = (yRef16)\% 16 \quad (H\text{-}37)$$

4. The variables shift1, shift2 and offset are derived as follows:

$$shift1 = RefLayerBitDepth_C - 8 \quad (H\text{-}38)$$

$$shift2 = 20 - BitDepth_C \quad (H\text{-}39)$$

$$offset = 1 << (shift2 - 1) \quad (H\text{-}40)$$

5. The sample value tempArray[n] with n=0 . . . 3, is derived as follows:

$$yPosRL = \\ Clip3(0, RefLayericHeightInSamplesC-1, yRef+n-1)$$ (H-41)

$$refWC = RefLayerPicWidthInSamplesC$$ (H-42)

$$tempArray[n] = \\ (f_C[xPhase, 0] * r1PicSample_C[Clip3(0, refWC-1, xRef-1), \\ yPosRL] + f_C[xPhase, 1] * r1PicSample_C[ \\ Clip3(0, refWC-1, xRef), yPosRL] + f_C[xPhase, 2] * r \\ 1PicSample_C[Clip3(0, refWC-1, xRef+1), yPosRL] + \\ f_C[xPhase, 3] * r1PicSample_C[ \\ Clip3(0, refWC-1, xRef+2), yPosRL]) >> shift1$$ (H-43)

6. The interpolated chroma sample value intChromaSample is derived as follows:

$$intChromaSample = \\ (f_C[yPhase, 0] * tempArray[0] + f_C[yPhase, 1] * \\ tempArray[1] + f_C[yPhase, 2] * tempArray[2] + \\ f_C[yPhase, 3] * tempArray[3] + offset) >> shift2$$ (H-44)

$$intChromaSample = \\ Clip3(0, (1 << BitDepth_C) - 1, intChromaSample)$$ (H-45)

In certain implementations, SHVC does not support SVC with the base layer including field pictures coded based on H.264/AVC while the enhancement layer(s) includes frame pictures coded based on HEVC. It may, however, be advantageous to migrate from 1080i (interlaced video) to 1080p (progressive video) with SHVC because of frequent use of H.264/AVC 1080i bitstreams for broadcasting.

In H.264/SVC, one approach for high coding efficiency of interlaced video sequence (e.g., 1080i resolution) involves supporting the adaptive frame/field coding in both the base layer and the enhancement layer, such that the base layer (e.g., the layer 0 302 of FIG. 3) and the enhancement layer picture (or pictures) can be a progressive frame, an interlaced frame, a top field picture, or a bottom field picture. To simplify the design of scalable video codecs while taking the advantage of systems with interlaced base layer streams, a lightweight, efficient scheme to support the interlaced base layer in SHVC should be implemented.

To overcome the issues with existing approaches for supporting the interlaced base layer in SHVC, this disclosure describes certain improvements below. As described, the methods and approaches presented may be used solely or in any combination.

In some embodiments, one or more flags may be signaled to support interlayer prediction from field picture(s) of 1080i to frame picture(s) of 1080p, for example. In at least one embodiment, a flag "bottom_field_to_frame_resampling_flag" is signaled to specify the resampling process method to generate the interlayer reference picture. If such a flag is set to or equals 1, this may be an indication that the input of the resampling process invoked to generate the interlayer reference pictures for the current picture is a bottom field picture and the output is a frame picture. If this flag is set to or equals 0, this may be an indication that the above described restriction does not apply. In at least one example, this flag may be signaled in the slice segment header, or any other high level syntax part. In another example, the value of this flag may be assigned via an external approach. For example, the flag is provided by the system level application.

In another embodiment, a flag "field_to_frame_resampling_present_flag" may be signaled to control the presence of the bottom_field_to_frame_resampling_flag. For example, field_to_frame_resampling_present_flag can be signaled in the Picture Parameter Set (PPS), Video Parameter Set (VPS), Sequence Parameter Set (SPS), or any other high level syntax part. In another example, the value of this flag could be assigned via an external approach.

In another embodiment, the following flags may be signaled to support interlayer prediction from field picture (e.g., 1080i) to frame pictures (e.g., 1080p). A flag "base_layer_field_picture_flag" may be signaled to specify whether the base layer pictures (e.g., layer 0 302 of FIG. 3) are field pictures. In one example, this flag can be signaled in VPS, SPS, or any other high level syntax part. In another example, the value of this flag may be assigned via an external approach.

In another embodiment, a flag "base_layer_bot_field_flag" may be signaled to specify whether the base layer picture of the current AU (e.g., the AU 405 of FIG. 4) is a bottom field picture. In one example, this flag can be signaled in the slice segment header, or any other high level syntax part. In another example, the value of this flag may be assigned via an external approach.

In yet another embodiment, a variable "botFieldtoFrameResamplingFlag" may be derived based on the signaled flags and used to calculate reference layer sample location, similar to the methods described above and in connection FIG. 6, FIG. 7, and FIG. 8.

In related aspects, a bitstream conformance restriction may be implemented such that when bottom_field_to_frame_resampling_flag (or base_layer_bot_field_flag) is equal to 1, then the cross_layer_phase_alignment_flag shall be equal to 0.

In further related aspects, a bitstream conformance restriction may be implemented such that when bottom_field_to_frame_resampling_flag is equal to 1 (or base_layer_bot_field_flag is equal to 1 and the base layer picture is the reference layer picture of the current picture), then the picture width of the current picture shall be equal to that of the reference (base) layer picture and the picture height of the current picture shall be the twice of that of the reference (base) layer picture.

In the case of multiple encoded layers, such as the example of FIG. 3 and FIG. 4, there exist possible scenarios where the bitstream is a mixture of field pictures and frame pictures. There also exist certain scenarios where a different layer has a different color format. For example, the first layer (e.g., the layer 0 302) and second layer (e.g., the layer 1 306) where the second layer has a second color format that is different from a first color format for the first layer). In such an example, the base layer (layer 0 302) may be in YUV420 format, whereas another layer may be in YUV422 or YUV444 color format.

In accordance with one or more aspects of the embodiments described herein, there is provided a technique to handle the phase offset (e.g., the phase 850 of FIG. 8) in multiple layer scenarios, such as those described herein. In one embodiment, instead of deriving the value of phase offset variable phaseX and phaseY by a few signaled flags at decoder (e.g., the decoder 31 of FIG. 5B) side, the encoder (e.g., the encoder 21 of FIG. 5A) can signal the phase offset 850 value. The transferred variable values may be used directly to derive the reference layer sample location. For example, four variables may be signaled for each pair of a current layer and its reference layer, such as, for example, "phase_offset_X_luma," "phase_offset_X_chroma," "phase_offset_Y_luma," and "phase_offset_Y_chroma." These variables may represent the phase offset 850 to derive a horizontal position of a reference layer luma sample, a horizontal position of a reference layer chroma sample, a vertical position of a reference layer luma sample, and a vertical position of a reference layer chroma sample. For example, the value of a given variable can be in range of zero (0) to four (4), inclusively. In another embodiment, the values may be, for example in the range of 0-15 inclusive, or 0-31 inclusive. When the related syntaxes are not present, they may be inferred to be equal to 0. In related aspects, the reference layer sample location may be derived according to the following approaches.

In one approach, the variables xRef16 and yRef16 may be derived as follows:

$$phaseX = (cIdx==0)?phase\_offset\_X\_luma:phase\_offset\_X\_chroma$$

$$phaseY = (cIdx==0)?phase\_offset\_Y\_luma:phase\_offset\_Y\_chroma$$

$$addX = (ScaleFactorX*phaseX+2)>>2$$

$$addY = (ScaleFactorY*phaseY+2)>>2$$

$$xRef16 = (((xP-offsetX)*ScaleFactorX+addX+(1<<11))>>12)-(phaseX<<2)$$

$$yRef16 = (((yP-offsetY)*ScaleFactorY+addY+(1<<11))>>12)-(phaseY<<2)$$

In another approach, the variables xRef16 and yRef16 may be derived as follows:

$$phaseX = (cIdx==0)?phase\_offset\_X\_luma:phase\_offset\_X\_chroma$$

$$phaseY = (cIdx==0)?phase\_offset\_Y\_luma:phase\_offset\_Y\_chroma$$

$$addX = (ScaleFactorX*phaseX+8)>>4$$

$$addY = (ScaleFactorY*phaseY+8)>>4$$

$$xRef16 = (((xP-offsetX)*ScaleFactorX+addX+(1<<11))>>12)-(phaseX)$$

$$yRef16 = (((yP-offsetY)*ScaleFactorY+addY+(1<<11))>>12)-(phaseY)$$

In another embodiment, the variables xRef16 and yRef16 may be derived as follows:

$$phaseX = (cIdx==0)?phase\_offset\_X\_luma:phase\_offset\_X\_chroma$$

$$phaseY = (cIdx==0)?phase\_offset\_Y\_luma:phase\_offset\_Y\_chroma$$

$$addX = (ScaleFactorX*phaseX+8)>>4$$

$$addY = (ScaleFactorY*phaseY+8)>>4$$

$$xRef16 = ((xP-offsetX)*ScaleFactorX+addX+(1<<11))>>12$$

$$yRef16 = ((yP-offsetY)*ScaleFactorY+addY+(1<<11))>>12$$

In the above example, the phase offset (e.g, the phase offset 850) at reference layer was merged into the signalled enhancement layer offset 850. When the syntax elements are not signalled, the appropriate default value may need to be set. The default value of phase_offset_X_chroma and phase_offset_Y_chroma is dependent on the relative position between luma and chroma sample position, and the scaling factor of the current layer and the reference layer (or the picture size of the current picture and the reference layer picture). As a further example, it is calculated by assuming that, in YUV420 format, the chroma sample is located at the same position to luma sample in horizontal direction and the chroma sample is located at the half pixel ("pel") position to luma sample in vertical direction.

For this case, the default values of the offsets can be set as follows:

The default value of phase_offset_X_luma, phase_offset_X_chroma and phase_offset_Y_luma is equal to 0, and the default value of phase_offset_Y_chroma is equal to: $4-((1<<18)+ScaleFactorY/2)/ScaleFactorY$.

Where scaling factor in vertical direction ScaleFactorY is as defined as follows:

$$ScaleFactorY = ((refLayerPicHeight<<16)+(currLayerPicHeight>>1))/currLayerPicHeight.$$

Where currLayerPicHeight and refLayerPicHeight represent the height of the current picture and the height of the reference layer picture which are used to calculate the vertical scaling factor.

Alternatively, the default value of phase_offset_Y_chroma can be set as follows by using the picture size directly:

$$4-(4*currLayerPicHeight+refLayerPicHeight/2)/refLayerPicHeight \text{ Or } (4*refLayerPicHeight-4*currLayerPicHeight+refLayerPicHeight/2)/refLayerPicHeight.$$

In another embodiment, the syntax type of a horizontal phase offset (e.g., the phase offset 850*b*) and a vertical phase offset (e.g., the phase offset 850*a*) may be different. The vertical phase offset syntax may be the same as the syntax in the embodiment described immediately above. That is, two variables may be signaled for each pair of a current layer and its reference layer, including phase_offset_Y_luma and phase_offset_Y_chroma, which may represent the phase offset to derive the vertical position of the reference layer luma sample and the vertical position of the reference layer chroma sample. For example, the value of the two variables can be in range of 0 to 15, inclusively, corresponding to the 1/16-th measurements between reference samples above. When the related syntaxes are not present, they may be inferred to be equal to 0. For the horizontal phase offset, a flag (e.g., horizontal_phase_alignment_flag) may be signaled for all layers in the whole bitstream. Alternatively, the horizontal_phase_alignment_flag may be signaled for each pair of a current layer and its reference layer. The horizontal_phase_alignment_flag may specify that, at the horizontal direction, the locations of the luma sample grids of the current layer and its reference layer are aligned at the center sample position of the pictures. When the horizontal_phase_alignment_flag is equal to 0, this specifies that, at the horizontal direction, the locations of the luma sample grids of the current layer and its reference layer are aligned at the top-left sample position of the pictures. When the horizontal_phase_alignment_flag is not present in the bitstream, its value may be inferred to be equal to 0. In related aspects, the reference layer sample location may be derived according to the following approaches.

In one approach, the variables xRef16 and yRef16 may be derived as follows:

phaseX=horizontal_phase_alignment_flag<<
  ((cIdx==0)?1:0)

phaseY=(cIdx==0)?phase_offset_Y_luma:phase_offset_Y_chroma addX=(ScaleFactorX*phaseX+2)>>2 addY=(ScaleFactorY*phaseY+2)>>2 xRef16=(((xP−offsetX)*ScaleFactorX+addX+
  (1<<11))>>12)−(phaseX<<2)

yRef16=(((yP−offsetY)*ScaleFactorY+addY+
  (1<<11))>>12)−(phaseY<<2)

When the color formats YUV422 and YUV444 are also considered, phaseX can be derived as follows:

phaseX=horizontal_phase_alignment_flag<<
  ((cIdx==0)?1:(2−SubWidthC))

In another approach, the variables xRef16 and yRef16 may be derived as follows:

phaseX=(horizontal_phase_alignment_flag<<
  (cIdx==0)?3:2)

phaseY=(cIdx==0)?phase_offset_Y_luma:phase_offset_Y_chroma addX=(ScaleFactorX*phaseX+8)>>4 addY=(ScaleFactorY*phaseY+8)>>4 xRef16=(((xP−offsetX)*ScaleFactorX+addX+
  (1<<11))>>12)−(phaseX)

yRef16=(((yP−offsetY)*ScaleFactorY+addY+
  (1<<11))>>12)−(phaseY)

In yet another embodiment, the encoder (e.g., the encoder 21 of FIG. 5A) may signal the value of the phase offset 850 and the transferred variable values may be used directly to derive the reference layer sample location. The phase offset 850 may be used to adjust the reference layer sample location after the reference layer location has been derived based on the default phase. For example, four variables may be signaled for each pair of a current layer and its reference layer, including, for example, phase_offset_X_luma, phase_offset_X_chroma, phase_offset_Y_luma, and phase_offset_Y_chroma. These variables may represent the phase offset 850 to derive a horizontal position of a reference layer luma sample, a horizontal position of a reference layer chroma sample, a vertical position of a reference layer luma sample, and a vertical position of a reference layer chroma sample. For example, the value of a given variable can be in the range of 0 to 15, inclusively. When the related syntaxes are not present, they may be inferred to be equal to 0. In related aspects, the reference layer sample location may be derived according to the following approaches.

The variables xRef16 and yRef16 may be derived as follows:

phase_offset_X=(cIdx==0)?phase_offset_X_luma:
  phase_offset_X_chroma phase_offset_Y=(cIdx==0)?phase_offset_Y_luma:
  phase_offset_Y_chroma xRef16=(((xP−offsetX)*ScaleFactorX+
  (1<<11))>>12)−phase_offset_X yRef16=(((yP−offsetY)*ScaleFactorY+
  (1<<11))>>12)−phase_offset_Y In some embodiments, when the syntax elements are not signalled, the values can be set as follows: the default value of phase_offset_X_luma, phase_offset_X_chroma and phase_offset_Y_luma is equal to 0. In some embodiments, the default value of phase_offset_Y_chroma is equal to ((1<<16)−ScaleFactorX)>>14;

Alternatively, the default value of phase_offset_Y_chroma is equal (4−(4*ScaleFactorX>>14), where scaling factor in vertical direction ScaleFactorY is as defined as follows:

ScaleFactorY=((refLayerPicHeight<<16)+(currLayerPicHeight>>1))/currLayerPicHeight, Where currLayerPicHeight can refLayerPicHeight represent the height of the current picture and the height of the reference layer picture which are used to calculate the vertical scaling factor.

Alternatively, the default value of phase_offset_Y_chroma can be set as follows by using the picture size directly:

4−(4*refLayerPicHeight+currLayerPicHeight/2)/currLayerPicHeight Or (4*currLayerPicHeight−4*refLayerPicHeight+currLayerPicHeight/2)/currLayerPicHeight In such embodiments, the default value of phase_offset_X_chroma and phase_offset_Y_chroma is therefore dependent on the relative position between luma and chroma sample position, and the scaling factor of the current layer and the reference layer. As an example, the default value may be calculated by assuming that, in YUV420 chroma format, the chroma sample is located at the same position to luma sample in horizontal direction and the chroma sample is located at the half pixel position to luma sample in vertical direction.

In still another embodiment, the syntax type of a horizontal phase offset 850b and a vertical phase offset 850a may be different. The vertical phase offset 850b syntax may be same as the syntax in the embodiment described immediately above. That is, two variables may be signaled for each pair of a current layer and its reference layer, including, for example, "phase_offset_Y_luma" and "phase_offset_Y_chroma," which represent the phase offset 850 to derive a vertical position of a reference layer luma sample and a vertical position of a reference layer chroma sample. For example, the value of the two variables can be in range of 0 to 15, inclusively. When the related syntaxes are not present, they may be inferred to be equal to 0. For the horizontal phase offset (e.g., the phase offset 850a), a flag (e.g., horizontal_phase_alignment_flag) may be signaled for all layers in the entire bitstream.

In some other embodiments, the horizontal_phase_alignment_flag may be signaled for each pair of a current layer and its reference layer. The horizontal_phase_alignment_flag may specify that, at the horizontal direction, the locations of the luma sample grids of the current layer and its reference layer are aligned at the center sample position of the pictures. For example, if the horizontal_phase_alignment_flag is equal to 0, this may specify that, at the horizontal direction, the locations of the luma sample grids of the current layer and its reference layer are aligned at the top-left sample position of the pictures. When the horizontal_phase_alignment_flag is not present in the bitstream, its value may be inferred to be equal to 0.

In related aspects, the reference layer sample location may be derived according to the following approaches.

In one approach, the variables xRef16 and yRef16 may be derived as follows:

phaseX=horizontal_phase_alignment_flag<<
    ((cIdx==0)?1:0)

phase_offset_Y=(cIdx==0)?phase_offset_Y_luma:
    phase_offset_Y_chroma addX=(ScaleFactorX*phaseX+2)>>2 xRef16=(((xP-offsetX)*ScaleFactorX+addX+
    (1<<11))>>12)-(phaseX<<2)

yRef16=(((yP-offsetY)*ScaleFactorY+
    (1<<11))>>12)-phase_offset_Y

When the color formats YUV422 and YUV444 are also considered, phaseX can be derived as follows:

phaseX=horizontal_phase_alignment_flag<<
    ((cIdx==0)?1:(2-SubWidthC))

In another approach, the variables xRef16 and yRef16 may be derived as follows:

phaseX=(horizontal_phase_alignment_flag<<
    (cIdx==0)?3:2)

phase_offset_Y=(cIdx==0)?phase_offset_Y_luma:
    phase_offset_Y_chroma addX=(ScaleFactorX*phaseX+8)>>4 xRef16=(((xP-offsetX)*ScaleFactorX+addX+
    (1<<11))>>12)-(phaseX)

yRef16=(((yP-offsetY)*ScaleFactorY+
    (1<<11))>>12)-phase_offset_Y

It is noted that any of the syntax mentioned above may be signaled in VPS, SPS, PPS or slice segment header, or any other syntax table(s).

In some embodiments, in order to address the case in which a reference layer could be a top field or bottom field, up to two sets of phase offset syntax elements can be signaled for each reference layer. For example, when two sets of phase offsets are signaled for a reference layer, a flag may be signaled in picture level, for example, in the slice header to indicate which set of phase offsets 850 is used for the resampling of the reference picture.

In some embodiments, the following bitstream conformance restrictions may be implemented, wherein such restrictions are used to limit the value of the phase offset to zero when the scaling factor is 1. The conformance restrictions facilitate achieving identical results with two methods: direct copy and using an upsampling process with zero phase filter coefficients.

In certain related aspects, when the ScaleFactorX is equal to 1, the value of phase_offset_X_luma and phase_offset_X_chroma shall be equal to 0; alternatively, when the ScaleFactorX is equal to 1, the syntax element of phase_offset_X_luma and phase_offset_X_chroma shall not be present in the bitstream and inferred to be equal to 0.

In certain embodiments, a bitstream conformance restriction may be implemented, such that when the ScaleFactorY is equal to 1, the value of phase_offset_Y_luma and phase_offset_Y_chroma shall be equal to 0; alternatively, when the ScaleFactorY is equal to 1, the syntax element of phase_offset_Y_luma and phase_offset_Y_chroma shall not be present in the bitstream and inferred to be equal to 0.

Some examples of signaling mechanisms in accordance with the above are set forth below.

Example 1

In some embodiments, the encoder 21 (FIG. 5A) can signal the value of phase offset value for every layer in the VPS to the decoder. Additionally this can be signaled based on the direct dependency of the layers, for example, the dependency association of current and reference layer.

The encoder can further signal phase offset update in the SPS, PPS or slice header or its extensions conditioned based on the VPS syntax elements.

For example, the signaling in VPS could be as below:

|  | Descriptor |
|---|---|
| vps_extension( ) { |  |
|   avc_base_layer_flag | u(1) |
| ..... |  |
|   phase_offset_present_flag | u(1) |
|   if( phase_offset_present_flag ) |  |
|   { |  |
|     phase_offset_update_flag | u(1) |
|     for( i = 1; i <= MaxLayersMinus 1; i++ ) |  |
|       for( j = 0; j < i; j++ ) |  |
|         if( direct_dependency_flag[ i ][ j ] ) |  |
|           hor_phase_luma[ i ][ j ] | u(3) |
|           ver_phase_luma[ i ][ j ] | u(3) |
|           hor_phase_chroma[ i ][ j ] | u(3) |
|           ver_phase_chroma[ i ][ j ] | u(3) |
|     } |  |
|   } |  |
| ..... |  |
|   for( i = 1; i <= vps_non_vui_extension_length; i++ ) |  |
|     vps_non_vui_extension_data_byte | u(8) |
|   vps_vui_present_flag |  |
|   if( vps_vui_present_flag ) { |  |
|     while( !byte_aligned( ) ) |  |
|       vps_vui_alignment_bit_equal_to_one | u(1) |
|     vps_vui( ) |  |
| } |  |

Regarding the above chart, the following definitions apply:

In some embodiments, "hor_phase_luma" specifies the phase offset used for reference layer luma sample location derivation in horizontal direction when reference layer nuh_layer_id is equal to layer_id_in_nuh[j]. Additionally, the current layer nuh_layer_id is equal to layer_id_in_nuh[i]. When not present, the value of hor_phase_luma[i][j] is inferred to be equal to 0.

In some embodiments, "ver_phase_luma" specifies the phase offset used for reference layer luma sample location derivation in vertical direction when reference layer nuh_layer_id equal to layer_id_in_nuh[j] and the current layer nuh_layer_id equal layer_id_in_nuh[i]. When not present, the value of ver_phase_luma [i][j] is inferred to be equal to 0.

The term "hor_phase_chroma" specifies the phase offset used for reference layer chroma sample location derivation in horizontal direction when reference layer nuh_layer_id equal to layer_id_in_nuh[j] and the current layer nuh_layer_id equal layer_id_in_nuh[i]. When not present, the value of hor_phase_chroma [i][j] is inferred to be equal to 0.

The term, "ver_phase_chroma" specifies the phase offset used for reference layer chroma sample location derivation in vertical direction when reference layer nuh_layer_id equal to layer_id_in_nuh[j] and the current layer nuh_layer_id equal layer_id_in_nuh[i]. When not present, the value of ver_phase_chroma[i][j] is inferred to be equal to 4−(4*currLayerPicHeight[i][j]+refLayerPicHeight[i][j]/2)/refLayerPicHeight[i][j].

Example 2

In some embodiments, the encoder 21 can signal the value of phase offset 850 value for every layer to the decoder. Alternatively, this can be signaled in VPS, SPS, PPS or its extensions. The following includes an example using picture level (PPS) signaling:

|  | Descriptor |
|---|---|
| pic_parameter_set_rbsp( ) { |  |
|   pps_extension_flag | u(1) |
|   if( pps_extension_flag ) { |  |
|     for ( i = 0; i < 8; i++ ) |  |
|       pps_extension_type_flag[ i ] | u(1) |
|     if( pps_extension_type_flag[ 1 ] ) { |  |
|       poc_reset_info_present_flag | u(1) |
|       phase_offset_present_flag | u(1) |
|       if( phase_offset_present_flag ) |  |
|       { |  |
|         hor_phase_luma | u(3) |
|         ver_phase_luma | u(3) |
|         hor_phase_criroma | u(3) |
|         ver_phase_chroma | u(3) |
|       } |  |
|     } |  |
|     if( pps_extension_type_flag[ 7 ] ) |  |
|       while( more_rbsp_data( ) ) |  |
|         pps_extension_data_flag | u(1) |
| } |  |

Regarding the above chart, the following definitions apply:

The term, "hor_phase_luma" specifies the phase offset used for reference layer luma sample location derivation in horizontal direction. When not present, the value of hor_phase_luma is inferred to be equal to 0.

The term "ver_phase_luma" specifies the phase offset used for reference layer luma sample location derivation in vertical direction. When not present, the value of ver_phase_luma is inferred to be equal to 0.

The term, "hor_phase_chroma" specifies the phase offset used for reference layer chroma sample location derivation in horizontal direction. When not present, the value of hor_phase_chroma is inferred to be equal to 0.

The term, "ver_phase_chroma" specifies the phase offset used reference layer chroma sample location derivation in vertical direction. When not present, the value of ver_phase_chroma is inferred to be equal to: 4−(4*currLayerPicHeight+refLayerPicHeight/2)/refLayerPicHeight.

For the above example, systems and methods of signaling, a number of sets of phase offset may be signaled in VPS or SPS or PPS or its extensions and a syntax element and may be coded at SPS or PPS or Slice header or its extension that codes the index of the set that would be used. A syntax element may be signaled to specify the number of sets present.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, circuits, and algorithm steps described in connection with the embodiments disclosed herein may be implemented as electronic hardware, computer software, or combinations of both. To clearly illustrate this interchangeability of hardware and software, various illustrative components, blocks, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC).

Although embodiments of the invention are described above for particular embodiment, many variations of the invention are possible. Additionally, features of the various embodiments may be combined in combinations that differ from those described above.

Those of skill will appreciate that the various illustrative blocks described in connection with the embodiment disclosed herein can be implemented in various forms. Some blocks have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a block or step is for ease of description. Specific functions or steps can be moved from one block or distributed across to blocks without departing from the invention.

The above description of the disclosed embodiment is provided to enable any person skilled in the art to make or use the invention. Various modifications to these embodiments will be readily apparent to those skilled in the art, and the generic principles described herein can be applied to other embodiment without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An apparatus for encoding scalable high efficiency video information, the apparatus comprising:
    a memory unit configured to store a syntax element for a multi-layer picture; and
    a processor operationally coupled to the memory unit and configured to
        determine a luma phase offset value between a luma sample position having a horizontal component and a vertical component in a reference layer and a corresponding luma sample position having a horizontal component and a vertical component in an enhancement layer, the luma phase offset value being determined in units of an enhancement layer luma sample,
        determine a chroma phase offset value between a chroma sample position having a horizontal component and a vertical component in the reference layer and a corresponding chroma sample position having a horizontal component and a vertical component in the enhancement layer the chroma phase offset value being determined in units of an enhancement layer chroma sample,
        generate the syntax element indicating a phase offset representing the luma phase offset value and the chroma phase offset value, and
        encode a block based on the syntax element.

2. The apparatus of claim 1, wherein the syntax element indicates to a decoder a bitstream conformance restriction to limit the phase offset value to be equal to zero when a scaling factor between the enhancement layer picture and the corresponding reference layer picture is equal to one.

3. The apparatus of claim 1, wherein the processor is further configured to generate the syntax element representing a phase offset value between a horizontal position of a reference layer luma sample and a horizontal position of an enhancement layer luma sample, a phase offset value between a horizontal position of a reference layer chroma sample and a horizontal position of an enhancement layer chroma sample, a phase offset value between a vertical position of a reference layer luma sample and a vertical position of an enhancement layer luma sample, and a phase offset value between a vertical position of a reference layer chroma sample and a vertical position of an enhancement layer chroma sample.

4. The apparatus of claim 1, wherein the processor is further configured to operate in any of a YUV420, YUV422, and a YUV444 color format.

5. The apparatus of claim 1, wherein the processor is further configured to determine an absent phase offset value depending on a relative position between the luma sample position and the chroma sample position and a scaling factor between a current layer and the reference layer.

6. The apparatus of claim 5, wherein the processor is further configured to determine the absent phase offset value based on the assumption that the chroma sample position is collocated with the luma sample position in the horizontal direction and the chroma sample position is located a one-half pixel from the luma sample position in the vertical direction, when using a YUV420 chroma format.

7. The apparatus of claim 5, wherein the processor is further configured to determine the absent phase offset value as follows:
    a default value of a horizontal luma phase offset (phase_offset_X_luma), a horizontal chroma phase offset (phase_offset_X_chroma), and a vertical luma phase offset (phase_offset_Y_luma) is zero, and
    a default value of a vertical chroma phase offset (phase_offset_Y_chroma) is equal to:

4−(4*currLayerPicHeight+refLayerPicHeight/2)/refLayerPicHeight, wherein currLayerPicHeight is a height of a current enhancement layer picture, and refLayerPicHeight is a height of the reference layer picture.

8. The apparatus of claim 1, wherein the processor is further configured to generate the syntax element in one of a Picture Parameter Set (PPS), a Video Parameter Set (VPS), a Sequence Parameter Set (SPS), and a slice segment header.

9. A method for encoding scalable high efficiency video information, the method comprising:
    determining a luma phase offset value between a luma sample position having a horizontal component and a vertical component in a reference layer and a corresponding luma sample position having a horizontal component and a vertical component in an enhancement layer, the luma phase offset value being determined in units of an enhancement layer luma sample;
    determining a chroma phase offset value between a chroma sample position having a horizontal component and a vertical component in the reference layer and a corresponding chroma sample position having a horizontal component and a vertical component in the enhancement layer, the chroma phase offset value being determined in units of an enhancement layer chroma sample;

generating a syntax element indicating the phase offset representing the luma phase offset value and the chroma phase offset value; and encoding a block based on the syntax element.

10. The method of claim 9, wherein the syntax element further indicates to a bitstream conformance restriction to limit the phase offset to be equal to zero when a scaling factor between the enhancement layer picture and the corresponding reference layer picture is equal to one.

11. The method of claim 9, wherein the syntax element represents a phase offset value between a horizontal position of a reference layer luma sample and a horizontal position of an enhancement layer luma sample, a phase offset value between a horizontal position of a reference layer chroma sample and a horizontal position of an enhancement layer chroma sample, a phase offset value between a vertical position of a reference layer luma sample and a vertical position of an enhancement layer luma sample, and a phase offset value between a vertical position of a reference layer chroma sample and a vertical position of an enhancement layer chroma sample.

12. The method of claim 9, further comprising operating in any of a YUV420, YUV422, and a YUV444 color format.

13. The method of claim 9, further comprising determining an absent phase offset value depending on a relative position between the luma sample position and the chroma sample position and a scaling factor between a current layer and the reference layer.

14. The method of claim 13, further comprising determining the absent phase offset value as follows:

a default value of a horizontal luma phase offset (phase_offset_X_luma), a horizontal chroma phase offset (phase_offset_X_chroma), and a vertical luma phase offset (phase_offset_Y_luma) is zero, and a default value of a vertical chroma phase offset (phase_offset_Y_chroma) is equal to:

4−(4*currLayerPicHeight+refLayerPicHeight/2)/refLayerPicHeight, wherein currLayerPicHeight is a height of a current enhancement layer picture, and refLayerPicHeight is a height of the reference layer picture.

15. An apparatus for decoding scalable high efficiency video information, the apparatus comprising:

a receiver configured to receive a bitstream having syntax elements for a multi-layer picture, the syntax elements having a phase offset representing a luma phase offset value and a chroma phase offset value;

a memory unit operationally coupled to the receiver and configured to store the syntax elements; and a processor operationally coupled to the memory unit and configured to obtain the luma phase offset value between a luma sample position having a horizontal component and a vertical component in a reference layer and a corresponding luma sample position having a horizontal component and a vertical component in an enhancement layer, the luma phase offset value being in units of an enhancement layer luma sample, obtain the chroma phase offset value between a chroma sample position having a horizontal component and a vertical component in the reference layer and a corresponding chroma sample position having a horizontal component and a vertical component in the enhancement layer, the chroma phase offset value being in units of an enhancement layer chroma sample, derive a reference layer sample position based on the luma phase offset value and the chroma phase offset value; and decode a block based on the received syntax elements and the phase offset.

16. The apparatus of claim 15, wherein the processor is further configured to decode the syntax elements from the bitstream, and obtain the phase offset from the decoded syntax elements.

17. The apparatus of claim 15, wherein the processor is further configured to select an interpolation filter for performance of an upsampling process using the phase offset.

18. The apparatus of claim 15, wherein the processor is further configured to limit the phase offset based on a bitstream conformance restriction, when a scaling factor between the enhancement layer picture and its reference layer picture is equal to one.

19. The apparatus of claim 15, wherein the processor further configured derive from the syntax element, a phase offset value between a horizontal position of a reference layer luma sample and a horizontal position of an enhancement layer luma sample, a phase offset value between a horizontal position of a reference layer chroma sample and a horizontal position of an enhancement layer chroma sample, a phase offset value between a vertical position of a reference layer luma sample and a vertical position of an enhancement layer luma sample, and a phase offset value between a vertical position of a reference layer chroma sample and a vertical position of an enhancement layer chroma sample.

20. The apparatus of claim 15, wherein the processor is further configured to derive the reference layer sample position (xRef16, yRef16) with a color component index (cIdx), the phase offset (phase_offset_X_luma, phase_offset_X_chroma, phase_offset_Y_luma, phase_offset_Y_chroma), and scaling factors (ScaleFactorX, ScaleFactorY), using the equation:

phase$X$=($c$Idx==0)?phase_offset_$X$_luma:phase_offset_$X$_chroma phase$Y$=($c$Idx==0)?phase_offset_$Y$_luma:phase_offset_$Y$_chroma add$X$=(ScaleFactor$X$*phase$X$+8)>>4 add$Y$=(ScaleFactor$Y$*phase$Y$+8)>>4

$x$Ref16=(($x$P−offset$X$)*ScaleFactor$X$+add$X$+(1<<11))>>12

$y$Ref16=(($y$P−offset$Y$)*ScaleFactor$Y$+add$Y$+(1<<11))>>12, wherein ScaleFactorX and ScaleFactorY refer to a spatial scaling ratio between the enhancement layer and the reference layer in horizontal and vertical direction, wherein xP, yP refers to the luma sample position or the chroma sample position in the enhancement layer picture, and wherein xRef16 and yRef16 refer to a collocated reference layer sample position in units of 1/16 sample.

21. The apparatus of claim 15, wherein the processor is further configured to determine a default phase offset value for an absent syntax element based on a relative position between the luma sample position and the chroma sample position and a scaling factor between a current layer and the reference layer.

22. The apparatus of claim 21, wherein the chroma sample position (xPc, yPc) is the same in a horizontal direction and the chroma sample position is located at a one-half pixel position to a luma sample in a vertical direction,
  wherein a default value of a horizontal luma phase offset (phase_offset_X_luma), a horizontal chroma phase offset (phase_offset_X_chroma), and a vertical luma phase offset (phase_offset_Y_luma) is zero, and
  wherein a default value of a vertical chroma phase offset (phase_offset_Y_chroma) is equal to:

4−(4*currLayerPicHeight+refLayerPicHeight/2)/refLayerPicHeight, wherein currLayerPicHeight is a height of a current enhancement layer picture, and refLayerPicHeight is a height of the reference layer picture.

23. The apparatus of claim 15, wherein the processor is further configured to derive the reference layer sample position in units of 1/16-th of a sample relative to a top-left sample in the reference layer.

24. The apparatus of claim 15, wherein the syntax element is derived from one of a Picture Parameter Set (PPS), a Video Parameter Set (VPS), a Sequence Parameter Set (SPS), and a slice segment header.

25. A method for decoding scalable high efficiency video information, the method comprising:
  Receiving a bitstream having syntax elements for a multi-layer picture, the syntax elements having a phase offset representing a luma phase offset value and a chroma phase offset value;
  obtaining the luma phase offset value between a luma sample position having a horizontal component and a vertical component in a reference layer and a corresponding luma sample position having a horizontal component and a vertical component in an enhancement layer, the luma phase offset value being in units of an enhancement layer luma sample;
  obtaining the chroma phase offset value between a chroma sample position having a horizontal component and a vertical component in the reference layer and a corresponding chroma sample position having a horizontal component and a vertical component in the enhancement layer, the chroma phase offset value being in units of an enhancement layer chroma sample;
  deriving a reference layer sample position based on the luma phase offset value and the chroma phase offset value; and
  decoding a block based on the received syntax elements and the phase offset.

26. The method of claim 25 further comprising limiting the phase offset based on a bitstream conformance restriction, when a scaling factor between the enhancement layer picture and its reference layer picture is equal to one.

27. The method of claim 25, wherein the syntax elements represent the phase offset used to derive a horizontal position of a reference layer luma sample, a horizontal position of a reference layer chroma sample, a vertical position of a reference layer luma sample, and a vertical position of a reference layer chroma sample.

28. The method of claim 25 further comprising deriving a collocated reference layer sample position (xRef16, yRef16), using a color component index (cIdx), the phase offset (phase_offset_X_luma, phase_offset_X_chroma, phase_offset_Y_luma, phase_offset_Y_chroma), and scaling factors (ScaleFactorX, ScaleFactorY) using the equation:

$phaseX = (cIdx==0)\text{?}phase\_offset\_X\_luma\text{:}phase\_offset\_X\_chroma$ $phaseY = (cIdx==0)\text{?}phase\_offset\_Y\_luma\text{:}phase\_offset\_Y\_chroma$ $addX = (ScaleFactorX * phaseX + 8) >> 4$ $addY = (ScaleFactorY * phaseY + 8) >> 4$ $xRef16 = ((xP - offsetX) * ScaleFactorX + addX + (1 << 11)) >> 12$ $yRef16 = ((yP - offsetY) * ScaleFactorY + addY + (1 << 11)) >> 12,$ wherein ScaleFactorX and ScaleFactorY refer to the spatial scaling ratio between the enhancement layer and the reference layer in horizontal and vertical direction,
  wherein xP, yP refers to the luma sample position or the chroma sample position in the enhancement layer picture, and
  wherein xRef16, yRef16 refers to the reference layer sample position in units of 1/16 sample.

29. The method of claim 25 further comprising determining a default phase offset value for an absent syntax element based on a relative position between the luma sample position and the chroma sample position and a scaling factor between a current layer and the reference layer.

30. The method of claim 29, wherein the default phase offset is generated as follows:
  a default value of a horizontal luma phase offset (phase_offset_X_luma), a horizontal chroma phase offset (phase_offset_X_chroma), and a vertical luma phase offset (phase_offset_Y_luma) is zero, and
  a default value of a vertical chroma phase offset (phase_offset_Y_chroma) is equal to:

4−(4*currLayerPicHeight+refLayerPicHeight/2)/refLayerPicHeight, wherein currLayerPicHeight is height of the current enhancement layer picture and refLayerPicHeight is height of the reference layer picture.

* * * * *